United States Patent
Van der Auwera et al.

(10) Patent No.: US 9,161,046 B2
(45) Date of Patent: Oct. 13, 2015

(54) DETERMINING QUANTIZATION PARAMETERS FOR DEBLOCKING FILTERING FOR VIDEO CODING

(75) Inventors: Geert Van der Auwera, San Diego, CA (US); Marta Karczewicz, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 13/495,821

(22) Filed: Jun. 13, 2012

(65) Prior Publication Data

US 2013/0101031 A1    Apr. 25, 2013

Related U.S. Application Data

(60) Provisional application No. 61/551,317, filed on Oct. 25, 2011.

(51) Int. Cl.
| | |
|---|---|
| *H04N 19/196* | (2014.01) |
| *H04N 19/14* | (2014.01) |
| *H04N 19/176* | (2014.01) |
| *H04N 19/117* | (2014.01) |
| *H04N 19/157* | (2014.01) |

(Continued)

(52) U.S. Cl.
CPC .......... *H04N 19/198* (2014.11); *H04N 19/117* (2014.11); *H04N 19/14* (2014.11); *H04N 19/157* (2014.11); *H04N 19/176* (2014.11); *H04N 19/86* (2014.11); *H04N 19/61* (2014.11)

(58) Field of Classification Search
CPC .................................................... H04N 19/00
See application file for complete search history.

(56) References Cited

U.S. PATENT DOCUMENTS

| | | | |
|---|---|---|---|
| 7,167,522 B2 | 1/2007 | Webb | |
| 7,899,123 B2 | 3/2011 | Xue et al. | |
| 2005/0243912 A1* | 11/2005 | Kwon et al. | 375/240.03 |

(Continued)

FOREIGN PATENT DOCUMENTS

| | | | |
|---|---|---|---|
| EP | 2320661 A2 * | 5/2011 | |
| JP | 2008271472 A | 11/2008 | |

(Continued)

OTHER PUBLICATIONS

Auwera, et al., "Varying QP Deblocking", PEG Meeting; Nov. 28, 2011-Dec. 2, 2011; Geneva; (Motion Picture Expert Group or ISO/IEC JTC1/SC29/WG11)., No. m21946, 8 pp.

(Continued)

*Primary Examiner* — Jorge L Ortiz Criado
*Assistant Examiner* — Kyle Lotfi
(74) *Attorney, Agent, or Firm* — Shumaker & Sieffert, P.A.

(57) ABSTRACT

A video coder determines a deblocking quantization parameter (QP) value based on at least one of a first QP value and a second QP value. Subsequently, the video coder applies a deblocking filter that is based on the deblocking filter to an edge associated with a first video block. The edge occurs at a boundary between the first video block and a second video block. The first video block is associated with a current coding unit (CU) and the second video block is associated with a neighboring CU. The current CU is included in a first quantization group and the neighboring CU is included in a second quantization group. The first QP value is defined for the first quantization group. The second QP value is defined for the second quantization group.

20 Claims, 9 Drawing Sheets

(51) Int. Cl.
*H04N 19/86* (2014.01)
*H04N 19/61* (2014.01)

(56) References Cited

U.S. PATENT DOCUMENTS

| | | |
|---|---|---|
| 2006/0262862 A1 | 11/2006 | Cheng et al. |
| 2008/0159404 A1 | 7/2008 | Hong et al. |
| 2010/0220931 A1 | 9/2010 | Zhou |
| 2010/0296588 A1 | 11/2010 | Fujii et al. |

FOREIGN PATENT DOCUMENTS

| | | |
|---|---|---|
| TW | I262726 B | 9/2006 |
| TW | I264951 B | 10/2006 |
| TW | 201010410 A | 3/2010 |
| TW | I327434 B | 7/2010 |
| TW | I327436 B | 7/2010 |
| WO | 2005120077 A1 | 12/2005 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
International Search Report and Written Opinion—PCT/US2012/061689—ISA/EPO—Apr. 18, 2013, 20 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
List, et al.,"Adaptive deblocking filter", IEEE Transactions on Circuits and Systems for Video Technology, IEEE Service Center, Piscataway, NJ, US, vol. 13, No. 7, Jul. 1, 2003, pp. 614-619, XP011221094.
Partial International Search Report—PCT/US2012/061689—ISA/EPO—Feb. 20, 2013, 9 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
International Preliminary Report on Patentability from International Application No. PCT/US2012/061689, dated Apr. 23, 2014, 12 pp.
Informal Communications from International Application No. PCT/US2012/061689, dated Feb. 7, 2014, 10 pp.
Chuang et al: "Quantization: Sub-LCU Delta QP", JCT-VC Meeting; MPEG Meeting; Mar. 16, 2011-Mar. 23, 2011; Geneva; (Joint Collaborative Team on Video Coding of ISO/IEC JTC1/SC29/WG11AND ITU-T SG .16 ) ; URL: http://wftp3.itu.int/av-arch/jctvc-site/, No. JCTVC-E051, XP030008557, 6 pp.
Kazushi Sato et al: "Preliminary Implementation on Sub-LCU-Level DeltaQP", Mar. 10, 2011, No. JCTVC-E220, Mar. 10, 2011, XP030008726, 4 pp.
Coban et al: "CU-Level QP Prediction", JCT-VC Meeting; MPEG Meeting; Mar. 16, 2011-Mar. 23, 2011; Geneva; (Joint Collaborative Team on Video Coding of ISO/IEC JTC1/SC29/WG11 AND ITU-T SG.16); URL: http://wftp3.itu.int/av-arch/jctvc-site/, No. JCTVC-E391, XP030008897, 4 pp.
Pang et al: "Sub-LCU QP representation", JCT-VC Meeting; MPEG Meeting; Mar. 16, 2011-Mar. 23, 2011; Geneva; (Joint Collaborative Team on Video Coding of ISO/IEC JTC1/SC29/WG11 AND ITU-T SG. 16 ) ; URL: http://wftp3.itu.int/av-arch/jctvc-site/, , No. JCTVC-E436, XP030008942, 4 pp.
Pang C et al: "Improved dQP Calculation Method", Mar. 10, 2011, No. JCTVC-E217, Mar. 10, 2011, XP030008723, 4 pp.
Budagavi et al., "Delta QP signaling at sub-LCU level" , JCT-VC Meeting; MPEG Meeting; Jan. 20, 2011-Jan. 28, 2011; Daegu; (Joint Collaborative Team on Video Coding of ISO / IEC JTC1/SC29/WG11and ITU-TSG. 16 ) ; URL: http://wftp3.itu.int/av-arch/jctvc-site/, No. JCTVC-D038, XP030008079, 5 pp.
Dong et al: "CU Adaptive Quantization Syntax Change for Better Decoder pipelining " , Joint Collaborative Team on Video Coding (JCT-VC) of ITU-T SG16 WP3 and ISO/IEC JTC1/SC29/WG11, vol. JCTVC-D258, Jan. 15, 2011, XP55021551, 3 pp.

* cited by examiner

| | | | | | | | | |
|---|---|---|---|---|---|---|---|---|
| | $p3_0$ | $p2_0$ | $p1_0$ | $p0_0$ | $q0_0$ | $q1_0$ | $q2_0$ | $q3_0$ | |
| | $p3_1$ | $p2_1$ | $p1_1$ | $p0_1$ | $q0_1$ | $q1_1$ | $q2_1$ | $q3_1$ | |
| | $p3_2$ | $p2_2$ | $p1_2$ | $p0_2$ | $q0_2$ | $q1_2$ | $q2_2$ | $q3_2$ | |
| A | $p3_3$ | $p2_3$ | $p1_3$ | $p0_3$ | $q0_3$ | $q1_3$ | $q2_3$ | $q3_3$ | B |
| | $p3_4$ | $p2_4$ | $p1_4$ | $p0_4$ | $q0_4$ | $q1_4$ | $q2_4$ | $q3_4$ | |
| | $p3_5$ | $p2_5$ | $p1_5$ | $p0_5$ | $q0_5$ | $q1_5$ | $q2_5$ | $q3_5$ | |
| | $p3_6$ | $p2_6$ | $p1_6$ | $p0_6$ | $q0_6$ | $q1_6$ | $q2_6$ | $q3_6$ | |
| | $p3_7$ | $p2_7$ | $p1_7$ | $p0_7$ | $q0_7$ | $q1_7$ | $q2_7$ | $q3_7$ | |

FIG. 7

DETERMINING QUANTIZATION PARAMETERS FOR DEBLOCKING FILTERING FOR VIDEO CODING

CLAIM OF PRIORITY UNDER 35 U.S.C. §119

The present application for patent claims priority to Provisional Application No. 61/551,317 entitled "DETERMINING QUANTIZATION PARAMETERS FOR DEBLOCKING FILTERING FOR VIDEO CODING" filed Oct. 25, 2011, and assigned to the assignee hereof and hereby expressly incorporated by reference herein.

TECHNICAL FIELD

This disclosure relates to video coding and, more particularly, filtering of decoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

SUMMARY

In general, this disclosure describes techniques for applying a deblocking filter to samples of a video block of a coding unit (CU). As described herein, a current CU is associated with a first video block and a neighboring CU is associated with a second video block. A video coder applies the deblocking filter to an edge of the first video block that occurs at a boundary between the first video block and the second video block. The current CU and the neighboring CU are in different quantization groups for which different quantization parameter (QP) values are defined. The deblocking filter is based on a deblocking QP value. The video coder determines the deblocking QP value based on the QP value defined for the first quantization group and/or the QP value defined for the second quantization group.

This disclosure describes a method of coding video data. The method comprises determining a deblocking QP value based on at least one of a first QP value and a second QP value. The method also comprises applying a deblocking filter based on the deblocking QP value to an edge occurring at a boundary between a first video block and a second video block. The first video block is associated with a first CU and the second video block is associated with a second CU. The first CU is included in a first quantization group. The first QP value is defined for the first quantization group. The second CU is included in a second quantization group. The second QP value is defined for the second quantization group.

This disclosure also describes a video coding device. The video coding device comprises means for determining a deblocking QP value based on at least one of a first QP value and a second QP value. In addition, the video coding device comprises means for applying a deblocking filter based on the deblocking QP value to an edge occurring at a boundary between a first video block and a second video block. The first video block is associated with a first CU and the second video block is associated with a second CU. The first CU is included in a first quantization group. The first QP value is defined for the first quantization group. The second CU is included in a second quantization group. The second QP value is defined for the second quantization group.

This disclosure also describes a video coding device that comprises one or more processors that are configured to determine a deblocking QP value based on at least one of a first QP value and a second QP value. The one or more processors are also configured to apply a deblocking filter based on the deblocking QP value to an edge occurring at a boundary between a first video block and a second video block. The first video block is associated with a first CU and the second video block is associated with a second CU. The first CU is included in a first quantization group. The first QP value is defined for the first quantization group. The second CU is included in a second quantization group. The second QP value is defined for the second quantization group.

This disclosure also describes a computer program product that comprises one or more computer-readable storage media that store computer-executable instructions that, when executed, configure a video coding device to determine a deblocking QP value based on at least one of a first QP value and a second QP value. The computer-executable instructions also configure the video coding device to apply a deblocking filter based on the deblocking QP value to an edge occurring at a boundary between a first video block and a second video block. The first video block is associated with a first CU and the second video block is associated with a second CU. The first CU is included in a first quantization group. The first QP value is defined for the first quantization group. The second CU is included in a second quantization group. The second QP value is defined for the second quantization group.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a conceptual diagram that indicates example labels of samples at a vertical boundary between a first video block "A" and a second video block "B."

DETAILED DESCRIPTION

The attached drawings illustrate examples. Elements indicated by reference numbers in the attached drawings correspond to elements indicated by like reference numbers in the following description. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are merely used to refer to different elements of a same or similar type.

A video coder may apply a deblocking filter to reduce the visibility of blocking artifacts associated with edges occurring at boundaries between video blocks. Blocking artifacts may include sharp discontinuities in brightness (luma) and/or color (chroma) samples that were not originally present in the video blocks. As used herein, the term "sample" may be used to interchangeably with the term "pixel."

As described herein, a current CU may be in a first quantization group and a neighboring CU may be in a second quantization group. The first and/or the second quantization group may include multiple CUs. A first quantization parameter (QP) value is defined for the first quantization group. A second QP value is defined for the second quantization group. Thus, the current CU is associated with the first QP value and the neighboring CU is associated with the second QP value.

In addition, the current CU may be associated with a first video block and a neighboring CU may be associated with a second video block. The first and second video blocks may be two-dimensional (2D) arrays of samples. The first video block may have a plurality of edges. The edges of the first video block may correspond to edges of prediction units (PUs) or transform units (TUs) associated with the current CU.

The video coder may apply deblocking filters to edges of the first video block. In some examples, if the edge occurs at a boundary between the current CU and the neighboring CU, the video coder determines a deblocking QP value based on at least one of the first QP value (i.e., the QP value defined for the first quantization group) or the second QP value (i.e., the QP value defined for the second quantization group). Because the video coder determines the deblocking QP value based on the QP value associated with the current CU and the QP value associated with the neighboring CU, the video coder may be able to avoid applying a deblocking filter that is too strong or too weak. Applying a deblocking filter that is too strong or too weak is possible if the deblocking QP value were determined solely based on the QP value associated with the current CU.

Figure 1:
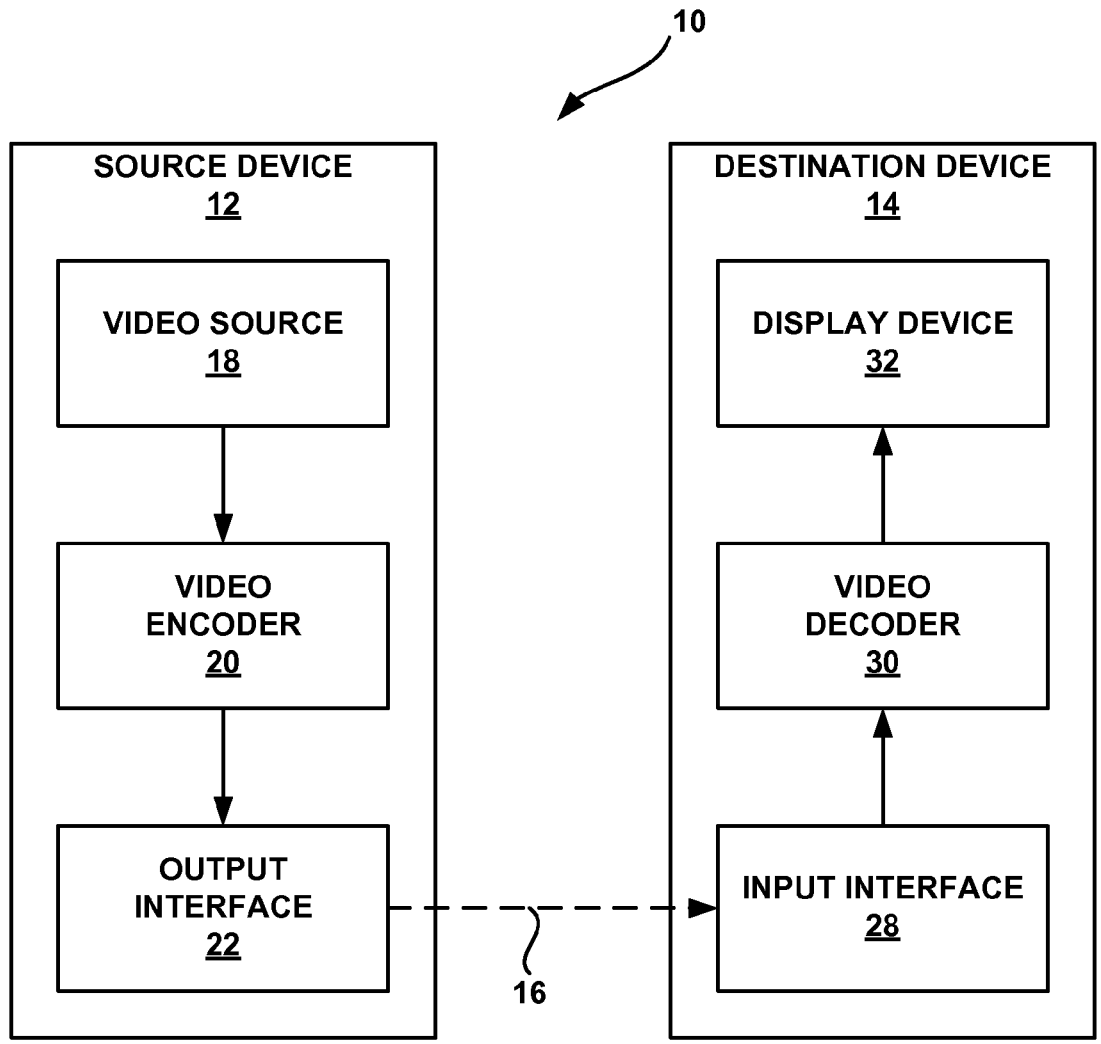
FIG. 1 is a block diagram illustrating an example video coding system that may utilize the techniques of this disclosure.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), FTP servers, network attached storage (NAS) devices, and local disk drives. Destination device 14 may access the encoded video data through any standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources.

Video encoder 20 may encode the captured, pre-captured, or computer-generated video. The encoded video data may be transmitted directly to destination device 14 via output interface 22 of source device 20. The encoded video data may also be stored onto a storage medium or a file server for later access by destination device 14 for decoding and/or playback.

Destination device 14 includes an input interface 28, a video decoder 30, and a display device 32. In some cases, input interface 28 may include a receiver and/or a modem. Input interface 28 of destination device 14 receives encoded video data over channel 16. The encoded video data communicated over channel 16, or provided on a data storage medium, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP). Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video data may comprise one or more sequences of pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations for sequences of pictures in the video data. When video encoder 20 performs an encoding operation for a sequence of pictures, video encoder 20 may generate a series of coded pictures and associated data. In addition, video encoder 20 may generate a sequence parameter set (SPS) that contains parameters applicable to one or more sequences of pictures. Furthermore, video encoder 20 may generate picture parameter sets (PPSs) that contain parameters applicable to one or more pictures as a whole.

To generate a coded picture, video encoder 20 may partition a picture into equally-sized video blocks. Each of the video blocks is associated with a treeblock. The video block associated with a treeblock may be a two-dimensional (2D) block of video samples. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation for a picture, video encoder 20 may perform encoding operations for each slice of the picture. The encoding operation for a slice may generate encoded data associated with the slice. The encoded data associated with the slice may be referred to as a "coded slice."

To generate the coded slice data for a slice, video encoder 20 may perform encoding operations on each treeblock in the slice. When video encoder 20 performs the encoding operation on a treeblock, video encoder 20 may generate a coded treeblock. The coded treeblock may comprise data representing an encoded version of the treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on each non-partitioned CU of a treeblock. As part of performing an encoding operation on a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block for a PU, video encoder 20 may generate the predicted video block for the PU based on decoded samples of the picture that contains the PU. When video encoder 20 uses inter prediction to generate the predicted video block for the PU, video encoder 20 may generate the predicted video block for the PU based on decoded values of reference pictures other than the picture that contains the PU.

When video encoder 20 uses inter prediction to generate a predicted video block for a PU, video encoder 20 may also generate motion information for the PU. The motion information for a PU may indicate a portion of another picture that corresponds to the video block of the PU. In other words, the motion information for a PU may indicate a "reference sample" for the PU. Video encoder 20 may generate the predicted video block for the PU based on the portions of the other pictures that are indicated by the motion information for the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data associated with transform units (TUs) of the CU. Each TU of a CU may be associated with a different block of the residual data of the CU. Video coder 20 may perform transform operations on each TU of the CU.

When video encoder 20 performs the transform operation on a TU, video encoder 20 may apply one or more transforms to the block of residual data associated with the TU to generate a transform coefficient block (i.e., a block of transform coefficients) associated with the TU. For instance, video encoder 20 may apply one or more transforms to the block of residual data to generate one or more transform coefficient blocks. The transform coefficient block may be a 2D matrix of transform coefficients.

After generating a transform coefficient block, video encoder 20 may perform a quantization operation on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may scan the quantized transform coefficients to produce a one-dimensional vector of transform coefficient levels. Video encoder 20 may entropy encode the one-dimensional vector. Video encoder 20 may also entropy encode syntax elements associated with the video data.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include entropy encoded syntax structures, such as entropy-encoded transform coefficient blocks, motion information, and so on.

Video encoder 20 may include syntax elements in the bitstream that indicate the QP values associated with CUs. In this way, video encoder 20 may signal the QP values associated with CUs. As described below, video decoder 30 may inverse quantize transform coefficient blocks and perform deblocking operations based on the QP values associated with CUs.

To signal the QP values associated with CUs efficiently, video encoder 20 may identify quantization groups. Each quantization group may include one or more CUs that are consecutive in coding order and that are associated with the same QP value. Video encoder 20 may signal the QP values associated with each CU in a quantization group by generating a single syntax element associated with the quantization group. The syntax element associated with the quantization group indicates that a given QP value is defined as the QP value associated with each CU in the quantization group. Based on the single syntax element associated with the quantization group, video decoder 30 may determine the QP values associated with each of the CUs in the quantization group. In this way, video encoder 20 may not need to generate separate syntax elements to signal the QP values associated with each CU in the quantization group.

For example, video encoder 20 may partition the video block of a treeblock into four smaller video blocks. The four smaller video blocks may be associated with four non-partitioned CUs. In this example, the four non-partitioned CUs are consecutive in coding order. Furthermore, in this example, each of the non-partitioned CUs may be associated with the QP value "8." Consequently, video encoder 20 may identify these four non-partitioned CUs as belonging to a quantization group. Video encoder 20 may signal the QP values associated with these four non-partitioned CUs by generating a syntax element associated with the quantization group. The syntax element associated with the quantization group may indicate that the QP value "8" is defined as the QP value associated with each of the four non-partitioned CUs.

To further increase the efficiency of signaling the QP values associated with CUs, the syntax element associated with a quantization group may specify a delta QP value instead of a QP value. A delta QP value (i.e., a dQP value) may be a difference between a first QP value and a second QP value. For example, the syntax element associated with a first quantization group may specify a delta QP value that indicates the difference between a QP value defined for the first quantization group and a QP value defined for a second quantization group. For instance, the dQP value may be added to the predicted QP value from the neighboring CU (left or last in decoding order) to produce the QP value for the present CU. Video encoder 20 may be able to signal a delta QP value using fewer bits than a full QP value.

For example, video encoder 20 may encode CUs in a neighboring quantization group prior to encoding CUs in a current quantization group. In this example, each CU in a current quantization group may be associated with the QP value "8." In this example, each CU in the neighboring quantization group may be associated with the QP value "9." Accordingly, video encoder 20 may generate a syntax element associated with the current quantization group that specifies the delta QP value of "−1." Video encoder 20 may be able to signal the value "−1" using fewer bits than the value "8."

A minimum CU quantization group size may be defined for one or more slices, pictures, or sequences of pictures. As video encoder 20 performs quadtree partitioning on the video block of a treeblock, video encoder 20 may partition the video block of the treeblock into progressively smaller clusters of four video blocks. Each of the video blocks may be associated with a different CU. In some instances, each video block in a cluster of video blocks may be smaller than the minimum CU quantization group size. If each video block in a cluster of video blocks is smaller than the minimum CU quantization group size, video encoder 20 may associate a single QP value with the CUs associated with the video blocks (or each non-partitioned sub-CU of the CUs) in the cluster. In this way, video encoder 20 may group the CUs (or each non-partitioned sub-CU of the CUs) associated with the video blocks in the cluster into a single quantization group.

Video encoder 20 may then generate a syntax element associated with the quantization group. In this way, the minimum CU quantization group size may prevent video encoder 20 from assigning different QP values to different CUs associated with a cluster when the video blocks of the cluster are smaller than the minimum CU quantization group size. By preventing video encoder 20 from assigning different QP values to different CUs associated with a cluster when the video blocks in the cluster are smaller than the minimum CU quantization group size, the minimum CU quantization group size may control the number of bits required to signal QP values. At the same time, signaling QP values for CUs having video blocks smaller than video blocks of treeblocks may allow for a finer granularity rate and visual quality control.

For example, a minimum CU quantization group size of sixteen samples may be defined for a picture. In this example, video encoder 20 may partition the video block of a treeblock in the picture into a cluster of four video blocks associated with consecutively coded non-partitioned CUs. Each of the video blocks in the cluster may be eight samples wide. Consequently, the video blocks in the cluster are smaller than the minimum CU quantization group size. Accordingly, video encoder 20 may group the CUs associated with the video blocks in the cluster into a single quantization group and may associate each of the CUs associated with the video blocks in the cluster with the same QP value. For instance, video encoder 20 may associate each of the CUs associated with the video blocks in the cluster with the QP value "8." In this example, video encoder 20 may generate a syntax element associated with the quantization group that defines the QP value "8" as the QP value associated with each CU in the quantization group.

Video encoder 20 may signal the minimum CU quantization group size. For example, video encoder 20 may signal the minimum CU quantization group size as a parameter "dQpMinCuSize." In some examples, video encoder 20 may signal the minimum CU quantization group size in a sequence parameter set, a picture parameter set, or elsewhere in a coded representation of video data.

In some examples, video encoder 20 only generates a syntax element that indicates the QP value defined for a quantization group when one or more of the transform coefficient blocks associated with TUs of the CUs in the quantization group include a non-zero transform coefficient. Thus, if the coded block flags (CBFs) for each of the CUs in a quantization group are false, video encoder 20 may not generate a syntax element that indicates a QP value defined for the quantization group.

Video decoder 30 may receive a bitstream generated by video encoder 20. The bitstream may include a coded representation of video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate prediction data for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual data for the CU. After generating the prediction data for PUs of the CU and reconstructing the residual data for the TUs of CU, video decoder 30 may reconstruct the video block of the CU based on the prediction data and the residual data. In this way, video decoder 30 may determine the video blocks of CUs based on the syntax elements in the coded representation of the video data.

As discussed above, video encoder 20 may signal the QP values associated with CUs by generating syntax elements associated with quantization groups. The syntax element associated with a quantization group may define a given QP value as the QP value associated with each CU in the quantization group. Video decoder 30 may inverse quantize transform coefficient blocks associated with TUs of the CUs based on the QP values associated with the CUs.

After reconstructing the video block of a CU, video decoder 30 may identify edges of the video block. The edges of the video block may correspond to edges of PUs (i.e., PU edges) and edges of TUs (i.e., TU edges) of the CU. The PU edges may correspond to tops, bottoms, or sides of video blocks of PUs of the CU. The TU edges may correspond to tops, bottoms, or sides of video blocks of TUs of the CU. In this disclosure, an "external edge" may be an edge that occurs at a boundary between video block associated with the CU and a video block associated with a neighboring CU. Likewise, an "internal edge" may be an edge that that occurs at a boundary between two neighboring PUs or TUs of the same CU.

After identifying the edges of the video block, video decoder 30 may perform deblocking operations on the edges of the video block. When video decoder 30 performs a deblocking operation on an external edge of the video block, video decoder 30 may determine the values of two thresholds, $t_c$ and $\beta$. Video decoder 30 may determine the values of $t_c$ and $\beta$ from the QP value associated with the CU. After determining the values of $t_c$ and $\beta$, video decoder 30 may determine, based on the values of $t_c$ and $\beta$, whether to apply a "strong" filter or a "weak" filter. A "strong" filter may modify samples further away from the external edge than a "weak" filter. For example, a "strong" filter may modify samples of the video blocks of a current CU and a neighboring CU up to three samples away from the external edge. On the other hand, a "weak" filter may modify samples up to two samples away from the external edge. Thus, the deblocking filter applied to the samples of the video block associated with the current CU and the video block associated with the neighboring CU may depend on the QP value associated with the current CU, but does not depend on the QP value associated with the neighboring CU.

In some circumstances, video decoder 30 may perform a deblocking operation to reduce the visibility of blocking artifacts at an external edge occurring at a boundary between neighboring CUs that are in different quantization groups. When video decoder 30 performs a deblocking operation on the external edge, the QP value defined for one of the quantization groups may be different than the QP value defined for the other quantization group. In other words, a neighboring CU may be associated with a different QP value than a current CU such that there are different QP values on both sides of the boundary between the current CU and the neighboring CU. For example, there may be a shared boundary between two neighboring CUs, CU-P and CU-Q, with CU-P either on the left or above CU-Q. In this example, QP-P may be the QP value associated with CU-P and QP-Q may be the QP value associated with CU-Q. In this example, if the current CU is CU-Q, then video decoder 30 may employ only QP-Q to determine the $t_c$ and $\beta$ thresholds. Hence, video coder 30 may apply a deblocking filter based on QP-Q.

However, if video decoder 30 were to use a deblocking filter based on the QP value associated with the current CU without taking the QP value associated with the neighboring CU into account, the deblocking filter may be too strong or too weak. In accordance with the techniques of this disclosure, video decoder 30 may apply a deblocking filter based on a deblocking QP value to an edge occurring at a boundary between a first video block and a second video block. The first video block may be associated with a first CU and the second video block may be associated with a second CU. The first CU and the second CU are in different quantization groups. Video decoder 30 may determine the deblocking QP value based on one or more of the QP values defined for the quantization groups. For instance, video decoder 30 may identify the threshold values $t_c$ and $\beta$ based on the deblocking QP value and then make a determination, based on the threshold values $t_c$ and $\beta$ whether to apply the deblocking filter to the samples and whether to apply a strong or weak deblocking filter. After video decoder 30 performs a deblocking operation on a CU, video decoder 30 may use the samples of the CU to perform intra predictions or inter prediction operations on PUs of other CUs.

Video encoder 20 may also determine a deblocking QP value and apply a deblocking filter based on the deblocking QP value in a similar way. Thus, a video coder, such as video encoder 20 or video decoder 30, may determine a deblocking QP value based on at least one of a first QP value and a second QP value. In addition, the video coder may apply a deblocking filter based on the deblocking QP value to an edge occurring at a boundary between a first video block and a second video block. The first video block may be associated with a first CU and the second video block may be associated with a second CU. The first CU is included in a first quantization group. The first QP value may be defined for the first quantization group. The second CU may be included in a second quantization group. The second QP value may be defined for the second quantization group.

Figure 2:
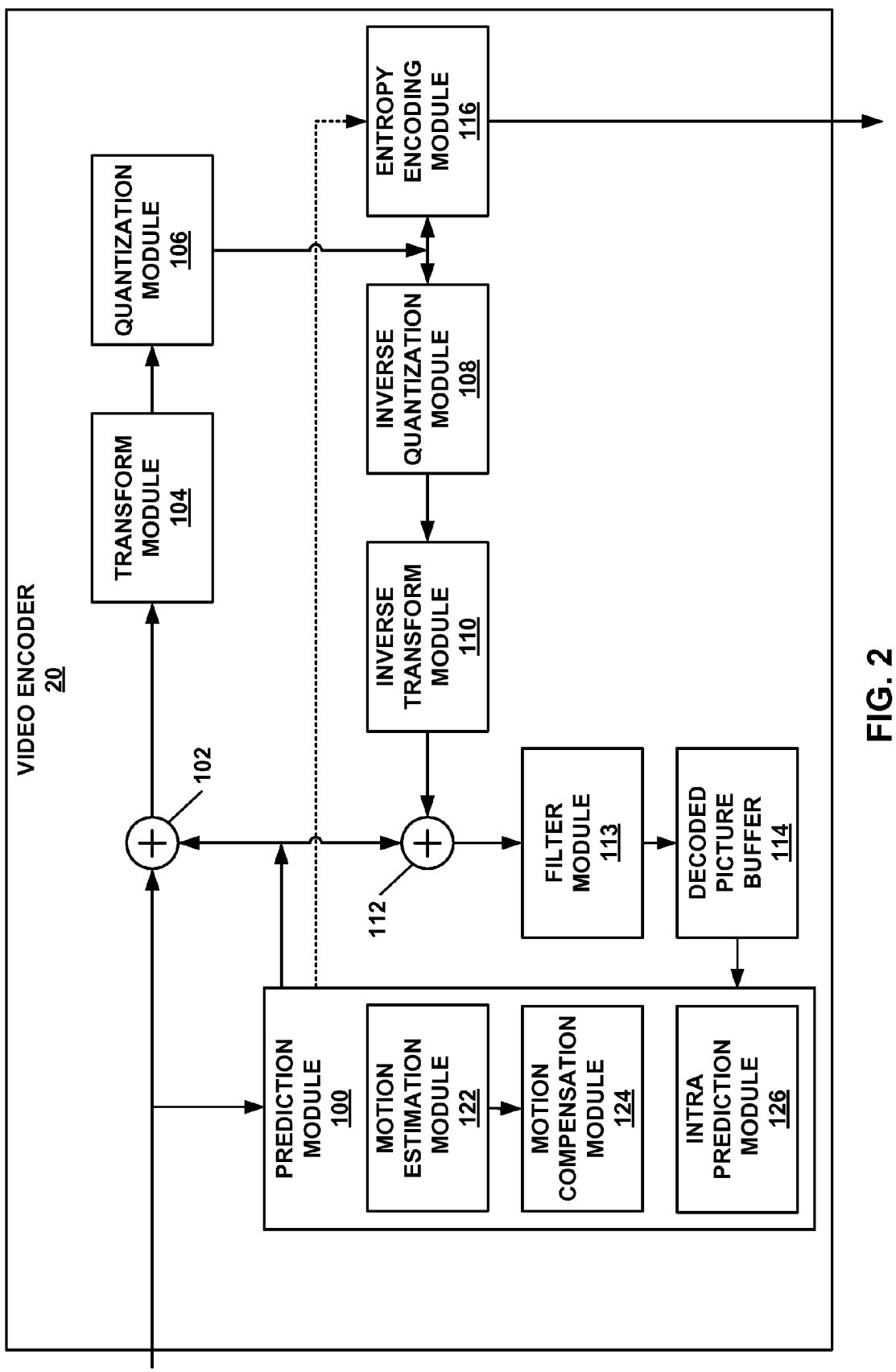
FIG. 2 is a block diagram illustrating an example video encoder that may implement the techniques of this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes a motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent sequences of pictures. To encode the video data, video encoder 20 may perform an encoding operation on each sequence of pictures. As part of performing the encoding operation on a sequence of pictures, video encoder 20 may perform encoding operations on each picture within the sequence of pictures. As part of performing the encoding operation on a picture, video encoder 20 may perform encoding operations on each slice in the picture. When video encoder 20 performs an encoding operation on a slice, video encoder 20 generates a coded slice. The coded slice is the slice in its encoded form. The coded slice may include a slice header and slice data. The slice header may contain syntax elements associated with the slice.

As part of performing an encoding operation on a slice, video encoder 20 may perform encoding operations on treeblocks in the slice. When video encoder 20 performs an encoding operation on a treeblock, video encoder 20 may generate a coded treeblock. The coded treeblock may comprise data representing an encoded representation of a treeblock. In other words, the coded treeblock may be an encoded representation of a treeblock.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In this disclosure, the term "video block" may be used to refer to a 2D block of samples. In general, a 16×16 block will have sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation for a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes may correspond to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may provide syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A leaf node in the quadtree data structure may be referred to as a "coding node." A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 may generate data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Motion estimation module 122 and motion compensation module 124 may perform inter prediction on each PU of the CU. Inter prediction may provide temporal compression. By performing inter prediction on a PU, motion estimation module 122 and motion compensation module 124 may generate prediction data for the PU based on decoded samples of reference pictures other than the picture that contains the CU. The prediction data for the PU may include a predicted video block and various syntax elements.

Furthermore, when motion estimation module 122 performs a motion estimation operation with regard to a PU, motion estimation module 122 may generate one or more motion vectors for the PU. For instance, slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of subsequent pictures in decoding order. When motion estimation module 122 performs the motion estimation operation with regard to a PU in a P slice, motion estimation module 122 may search the reference pictures in list 0 for a reference sample for the PU. The reference sample of the PU may be a set of samples, e.g., a block of samples that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference sample of a PU in a P slice, motion estimation module 122 may generate a reference index that indicates the reference picture in list 0 containing the reference sample and a motion vector that indicates a spatial displacement between the PU and the reference sample. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference sample values may be interpolated from integer-position sample values in the reference picture. Motion estimation module 122 may output motion information for the PU to entropy encoding module 116 and motion compensation module 124. The motion information for the PU may include the reference index and the motion vector of the PU. Motion compensation module 124 may use the motion information of a PU to identify and retrieve the reference sample of the PU.

If the PU is in a B slice, the picture containing the PU may be associated with two lists of reference pictures, referred to as "list 0" and "list 1." Each of the reference pictures in list 0 contains samples that may be used for inter prediction of subsequent pictures in decoding order. The reference pictures in list 1 occur before the picture in decoding order but after the picture in presentation order. In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference sample for the PU. Motion estimation module 122 may then generate a reference index that indicates the reference picture in list 0 or list 1 that contains the reference sample and a motion vector that indicates a spatial displacement between the PU and the reference sample. Motion estimation module 122 may output motion information for the PU to entropy encoding module 116 and motion compensation module 124. The motion information for the PU may include the reference index, a prediction direction indicator, and the motion vector of the PU. The prediction direction indicator may indicate whether the reference index indicates a reference picture in list 0 or list 1. Motion compensation module 124 may use the motion information of the PU to identify and retrieve the reference sample of the PU.

When motion estimation module 122 performs bi-directional prediction for a PU, motion estimation module 122 may search the reference pictures in list 0 for a reference sample for the PU and may also search the reference pictures in list 1 for another reference sample for the PU. Motion estimation module 122 may then generate reference indexes that indicate the reference pictures in list 0 and list 1 containing the reference samples and motion vectors that indicate spatial displacements between the reference samples and the PU. Motion estimation module 122 may output motion information of the PU to entropy encoding module 116 and motion compensation module 124. The motion information for the PU may include the reference indexes and the motion vectors of the PU. Motion compensation module 124 may use the motion information to identify and retrieve the reference sample of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a quadtree node for a CU associated with the PU, a value that indicates to video decoder 30 that the PU has the same motion information as the neighboring PU. In another example, motion estimation module 122 may identify, in a quadtree node associated with the CU associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to predict the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes, depending on the size of the PU.

Intra prediction module 126 may select one of the sets of prediction data for the PU. In various examples, intra prediction module 126 may select the set of prediction data for the PU in various ways. For example, intra prediction module 126 may select the set of prediction data for the PU by calculating rate/distortion metrics for the sets of prediction data and selecting the set of prediction data that has the lowest rate/distortion metric.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PU, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predicted video block of the prediction data of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video block of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. In various examples, transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU. Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to from corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may identify edges associated with the video block. Each edge may correspond to an edge of a PU or a TU of the CU. After identifying the edges, filter module 113 may perform deblocking operations on one or more of the identified edges. For example, filter module 113 may perform deblocking operations on each of the identified edges except edges adjacent to a boundary of a picture that contains the CU, edges for which the deblocking filter is disabled, and edges that coincide with tile or slice boundaries when certain flags are set. Furthermore, in some examples, filter module 113 does not perform a deblocking operation on an edge when the edge is a PU edge or a TU edge that is less than eight pixels in either a vertical or horizontal direction and the edge does not lie on an 8×8 sample grid.

Filter module 113 may perform deblocking operations on vertical edges first, starting with an edge on a left-hand side of the video block and proceeding through the vertical edges toward a right-hand side of the video block in geometrical order. Then, filter module 113 may perform deblocking operations on horizontal edges, starting with an edge on the top of the video block and proceeding through the horizontal edges toward the bottom of the video block in geometric order. Performing a deblocking operation on an edge, filter module 113 may reduce blocking artifacts in a portion of the video block that corresponds to the edge.

The edges associated with the video block may include internal edges and external edges. When filter module 113 applies a deblocking operation to an internal edge associated with the video block of a CU, filter module 113 may modify samples of the video block of the CU to reduce the visibility of blocking artifacts associated with the edge. When filter module 113 applies a deblocking operation to an external edge associated with the video block of a current CU, filter module 113 may modify samples of the video block of the current CU and may modify samples of a video block of a neighboring CU to reduce the visibility of blocking artifacts associated with the edge.

When filter module 113 performs a deblocking operation on an external edge of the video block associated with a current CU, filter module 113 may apply a deblocking filter that is based on a deblocking QP value. Filter module 113 may determine the deblocking QP value based on at least one of a QP value defined for a quantization group that includes the current CU and a QP value defined for a quantization group that includes the neighboring CU. Filter module 113 may perform various deblocking operations on external edges of the video block associated with the current CU. For example, filter module 113 may perform the deblocking operation illustrated in the example of FIG. 6 or the deblocking operation illustrated in the example of FIGS. 8 and 9 on external edges of the video block associated with the current CU.

After performing one or more deblocking operations on the edges associated with the video block of a CU, filter module 113 may store the reconstructed video block of the CU in decoded picture buffer 114. Motion estimation module 122 and motion compensation module 124 may use a reference picture that contains the reconstructed video block to perform inter prediction on CUs of subsequent pictures. In addition, intra prediction module 126 may use reconstructed video blocks in decoded picture buffer 114 to perform intra prediction. Thus, video encoder 20 may perform, based on reconstructed video blocks of CUs in decoded picture buffer 114, an intra prediction or inter prediction operation on a PU of another CU. For instance, after applying a deblocking filter to an edge occurring at a boundary between a first video block and a second video block, video encoder 20 may use data from the first video block or the second video block to encode a third video block.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data.

As part of performing an entropy encoding operation on data, entropy encoding module 116 may select a context model. If entropy encoding module 116 is performing a CABAC operation, the context model may indicate estimates of probabilities of particular bins. Context modeling may provide estimates of conditional probabilities of a current symbol given symbols that have already been coded in the neighborhood of the current symbol. In the context of CABAC, the term "bin" is used to refer to a bit of a binarized version of a syntax element. If the entropy encoding module 116 is performing a CAVLC operation, the context model may map coefficients to corresponding codewords. Codewords in CAVLC may be constructed such that relatively short codes correspond to more probable symbols, while relatively long codes correspond to less probable symbols. Selection of an appropriate context model may impact coding efficiency of the entropy encoding operation.

In some instances, entropy encoding module 116 may select the context model for the data based on information generated by performing entropy encoding operations on other sets of data. For example, the residual data associated with neighboring TUs are likely to contain similar samples. Accordingly, transform coefficient blocks for neighboring TUs are likely to contain similar transform coefficients. Hence, the probabilities of bins in neighboring transform coefficient blocks are likely to be similar. Accordingly, entropy encoding module 116 may use information regarding the probability of bins in a first transform coefficient block to select a context model for entropy encoding a second, neighboring transform coefficient block.

Entropy encoding module 116 may output a bitstream that includes a series of NAL units. As discussed above, each of the NAL units may be a syntax structure containing an indication of a type of data in the NAL unit and bytes containing the data.

In some examples, the bitstream includes syntax elements that indicate QP values defined for quantization groups. For example, video encoder 20 may generate a coded representation of video data. The coded representation of the video data may include a plurality of syntax elements, including a first syntax element and a second syntax element. The first syntax element may indicate that a first QP value is defined as a QP value associated with each CU in a first quantization group. The second syntax element may indicate that a second QP value is defined as a QP value associated with each CU in a second quantization group. A sequence parameter set, a picture parameter set, or another portion of the bitstream may include the syntax elements that indicate QP values defined for quantization groups.

Figure 3:
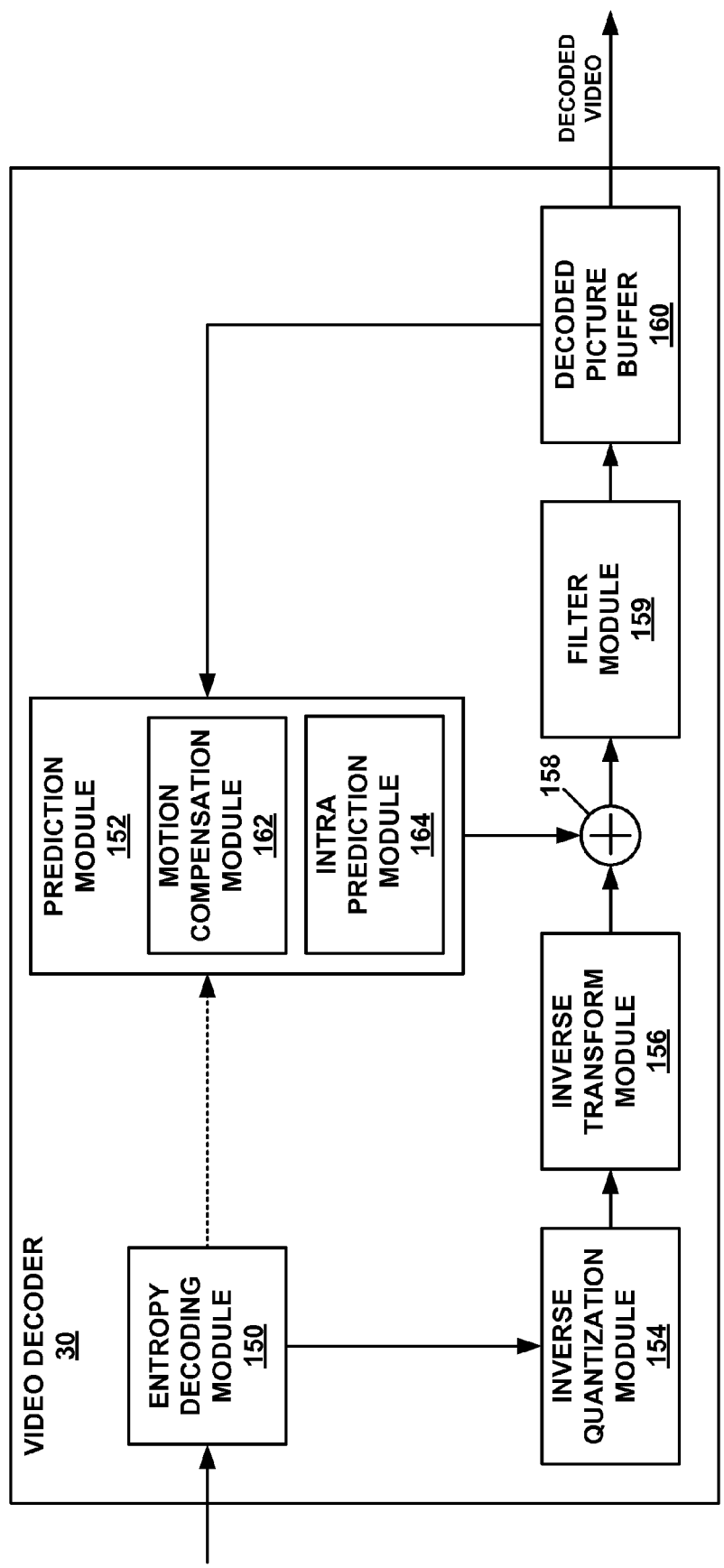
FIG. 3 is a block diagram illustrating an example video decoder that may implement the techniques of this disclosure.

FIG. 3 is a block diagram that illustrates an example video decoder 30 that may implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. In other words, video decoder 30 may receive a coded representation of video data. The coded representation of the video data may include a plurality of syntax elements. Video decoder 30 may determine video blocks of CUs based on the syntax elements in the coded representation of the video data.

When video decoder 30 receives the bitstream, entropy decoding module 150 may perform a parsing operation on the bitstream. As a result of performing the parsing operation on the bitstream, entropy decoding module 150 may extract syntax elements from the bitstream. The parsing operation may include entropy decoding of the bitstream. The syntax elements may include entropy-decoded transform coefficient blocks. Prediction module 152, inverse quantization module 154, inverse transform module 156, reconstruction module 158, and filter module 159 may perform a reconstruction operation that generates decoded video data based on the syntax elements.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on. A sequence parameter set is a syntax structure that contains syntax elements that apply to zero or more entire coded video sequences. A picture parameter set is a syntax structure containing syntax elements that apply to zero or more entire coded pictures. A picture parameter set associated with a given picture may include a syntax element that identifies a sequence parameter set associated with the given picture.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform an entropy decoding operation, such as a CAVLC decoding operation, on the coded slice header to recover the slice header.

After extracting the slice data from coded slice NAL units, entropy decoding module 150 may extract coded treeblocks from the slice data. Entropy decoding module 150 may then extract coded CUs from the coded treeblocks. Entropy decoding module 150 may perform parsing operations that extract syntax elements from the coded CUs. The extracted syntax elements may include entropy-encoded coefficient blocks.

Entropy decoding module 150 may then perform entropy decoding operations on the syntax elements. For instance, entropy decoding module 150 may perform CABAC operations on the coefficient blocks.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

If a PU of the CU was encoded using inter prediction, motion compensation module 162 may perform motion compensation to generate a predicted video block for the PU. Motion compensation module 162 may use motion information for the PU to identify a reference sample for the PU. The reference sample of a PU may be in a different temporal picture than the PU. The motion information for the PU may include a motion vector, a reference picture index, and a prediction direction. Motion compensation module 162 may use the reference sample for the PU to generate the predicted video block for the PU. In some examples, motion compensation module 162 may predict the motion information for the PU based on motion information of PUs that neighbor the PU. In this disclosure, a PU is an inter-predicted PU if video encoder 20 uses inter prediction to generate the predicted video block of the PU.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to predict the intra prediction mode of the PU. In some instances, the syntax elements may indicate that intra prediction module 164 is to use the intra prediction mode of another PU to predict the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

Reconstruction module 158 may use the residual video block of a CU and the predicted video blocks for the PUs of the CU, i.e., either intra-prediction data or inter-prediction data, as applicable, to reconstruct the video block of the CU.

After reconstruction module 158 reconstructs the video block of the CU, filter module 159 may identify edges associated with the video block. Each edge may correspond to an edge of a PU or a TU of the CU. After identifying the edges, filter module 158 may perform deblocking operations one or more of the identified edges to remove blockiness artifacts from the video block of the CU. Filter module 159 may perform the deblocking operations in the manner described above with regard to filter module 113.

When filter module 159 performs a deblocking operation on an external edge associated with the video block of a current CU, filter module 159 may apply a deblocking filter that is based on a deblocking QP value for the current CU. Filter module 159 may determine the deblocking QP value of the current CU based on at least one of a QP value defined for a quantization group that includes the current CU and a QP value defined for a quantization group that includes the neighboring CU. Filter module 159 may apply various external deblocking operations to the external edge. For example, filter module 159 may apply the deblocking operation illustrated in the example of FIG. 6 or the deblocking operation illustrated in the example of FIGS. 8 and 9 to the external edge.

In some examples, the coded representation of the video data may include syntax elements that indicate QP values defined for quantization groups. For example, the coded representation of the video data may include a first syntax element and a second syntax element. The first syntax element may indicate that a first QP value is a QP value defined for a first quantization group. The second syntax element may indicate that a second QP value is a QP value defined for a second quantization group. In this example, filter module 159 may determine, based on the first syntax element, that a first CU in the first quantization group is associated with the first QP value and may determine, based on the second syntax element, that a second CU in the second quantization group is associated with the second QP value. Furthermore, if the first quantization group includes a third CU, filter module 159 may determine, based on the first syntax element, that the third CU is associated with the first QP value. Filter module 159 may determine a deblocking QP value based on the QP value defined for the first quantization group and/or the QP value defined for the second quantization group.

Decoded picture buffer 160 may store the decoded samples for pictures of the video data. Thus, after filter module 159 performs deblocking operations on edges associated with the video block of a CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
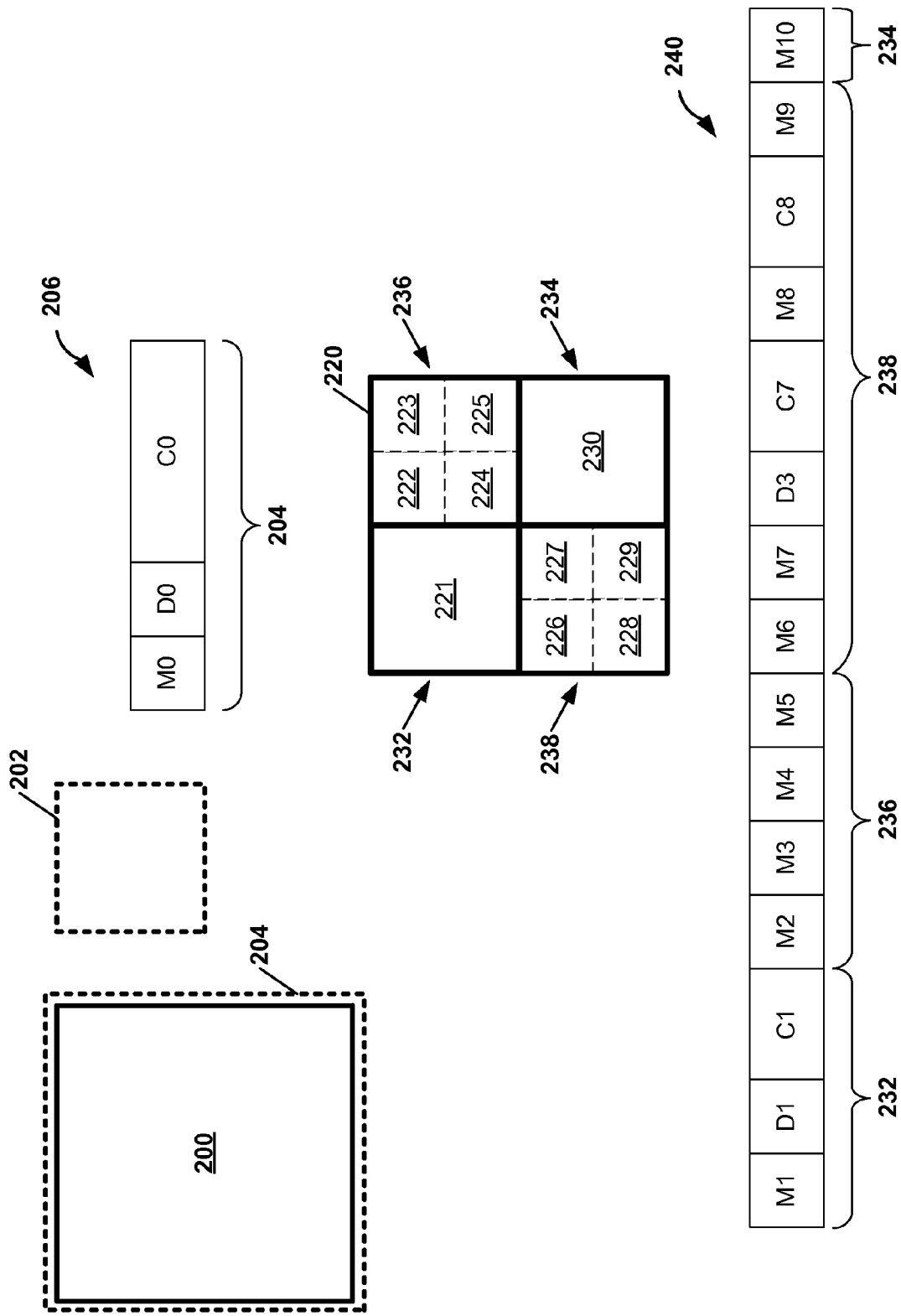
FIG. 4 is a conceptual diagram illustrating exemplary delta quantization parameter (QP) value signaling for video blocks of different sizes.

FIG. 4 is a conceptual diagram that illustrates example signaling of QP values associated with CUs. A video block 200 associated with an LCU is not partitioned into any sub-blocks. In the example of FIG. 4, a video block 200 is shown next to a video block 202. Video block 202 indicates a minimum CU quantization group size. A quantization group 204 may include only the LCU associated with video block 200 because video block 200 is larger than the minimum CU quantization group size.

Furthermore, FIG. 4 shows a coded representation 206 of the LCU associated with video block 200. The coded representation 206 includes a set of syntax values M0, a syntax element D0 that indicates a QP value defined for quantization group 204, and a set of syntax values C0. The set of syntax values M0 may indicate a coding mode of the LCU associated with video block 200. The set of syntax values C0 may include transform coefficients associated with the LCU.

FIG. 4 also shows a video block 220 associated with a LCU. Video block 220 is partitioned into ten video blocks, numbered 221-230. Each of video blocks 221-230 may be associated with a non-partitioned CU. Video block 221 is the same size as the minimum CU quantization group size, i.e., video block 221 is the same size as video block 202. Because video block 221 is at least as large as the minimum CU quantization group size, a quantization group 232 may include only the CU associated with video block 221. Video block 230 is also the same size as the minimum CU quantization group size, i.e., video block 230 is the same size as block 202. Likewise, because video block 230 is at least as large as the minimum CU quantization group size, a quantization group 234 may include only the CU associated with video block 230.

In contrast, video blocks 222, 223, 224, and 225 are a cluster of video blocks that are each smaller than the minimum CU quantization group size. Because video blocks 222-225 are smaller than the minimum CU quantization group size, the CUs associated with video blocks 222-225 do not belong to different quantization groups. Rather, in the example of FIG. 4, a single quantization group 236 includes the CUs associated with video blocks 222-225. Thus, the CUs associated with video blocks 222-225 may each be associated with (i.e., share) a single QP value defined for quantization group 236. Video blocks 226-229 are another cluster of video blocks that are each smaller than the minimum CU quantization group size. Hence, in the example of FIG. 4, a single quantization group 238 includes CUs associated with video blocks 226-229. The CUs associated with video blocks 226-229 may each be associated with (i.e., share) a single QP value defined for quantization group 238.

FIG. 4 also shows an example coded representation 240 of the LCU associated with video block 220. The coded representation 240 includes sets of syntax elements M1, D1, C1, M2, M3, M4, M5, M6, M7, D3, C7, M8, C8, M9, and M10. Syntax elements M1 may indicate a coding mode for the CU associated with video block 221. Syntax element D1 may indicate a QP value defined for quantization group 232. Syntax elements C1 may indicate transform coefficients associated with the CU associated with video block 221. In the example of FIG. 4, it is assumed that the CU associated with video block 221 is associated with at least one non-zero transform coefficient.

Syntax elements M2-M5 may indicate coding modes for the CUs associated with video blocks 222-225. In the example of FIG. 4, it is assumed that the CUs associated with video blocks 222-225 are encoded using skip mode or the transform coefficients associated with the CUs associated with video blocks 222-225 are all equal to zero. When a video encoder, such as video encoder 20, encodes a CU using skip mode, the video encoder does not generate transform coefficients associated with the CU. However, a video decoder, such as video decoder 30, may assume that the video block of the CU is the same as a collocated video block of a previously decoded picture. Accordingly, in the example of FIG. 4, coded representation 240 does not include syntax elements that indicate the transform coefficients associated with the CUs associated within video blocks 222-225. Furthermore, because the video encoder does not generate transform coefficients associated with the CUs associated with video blocks 222-225 or because the transform coefficients associated with the CUs associated with video blocks 222-225 are all equal to zero, coded representation 240 does not include a syntax element that indicates a QP value defined for quantization group 236.

Syntax elements M6-M9 may indicate coding modes for the CUs associated with the video blocks 226-229. Furthermore, in the example of FIG. 4, it is assumed that the CUs associated with video blocks 226 and 229 are encoded in skip mode or that all transform coefficients associated with the CUs associated with the video blocks 226 and 229 are equal to zero. Accordingly, coded representation 240 does not include syntax elements that indicate transform coefficients associated with the CUs associated with video blocks 226 and 229.

However, it is also assumed in the example of FIG. 4 that the CUs associated with video blocks 227 and 228 are both associated with at least one non-zero transform coefficient. Accordingly, coded representation 240 includes syntax elements C7 and C8. Syntax elements C7 indicate transform coefficients associated with the CU associated with video block 226. Syntax elements C8 indicate transform coefficients associated with the CU associated with video block 228.

Because at least one CU in quantization group 238 is associated with at least one non-zero transform coefficient, the video encoder signals the QP value defined for quantization group 238. Accordingly, syntax element D3 in coded representation 240 indicates the QP value defined for quantization group 238. In the example of FIG. 4, syntax element D3 is located after the syntax element (i.e., M7) that indicates the coding mode for the first CU in quantization group 238 that is associated with at least one non-zero transform coefficient (i.e., the CU associated with video block 227). Coded representation 240 does not include a syntax element that indicates another QP value after syntax element M8 because the QP value defined for quantization group 238 is associated with each CU in quantization group 238.

Syntax elements M10 may indicate a coding mode for the CU associated with video block 230. In the example of FIG. 4, it is assumed that the CU associated with video block 230 is encoded using skip mode or that all transform coefficients associated with the CU associated with video block 230 are equal to zero. Accordingly, coded representation 240 does not include syntax elements that indicate transform coefficients associated with the CU associated with video block 230.

In the example of FIG. 4, syntax elements D0, D1, and D3 may indicate the QP values defined for quantization groups 204, 232, and 238 by specifying delta QP values. As described above, a delta QP value may express a QP value by indicating the difference between the QP value and another QP value. For instance, syntax element D3 may indicate the QP value defined for quantization group 238 by indicating the difference between the QP value defined for quantization group 238 and the QP value defined for quantization group 232.

Figure 5A:
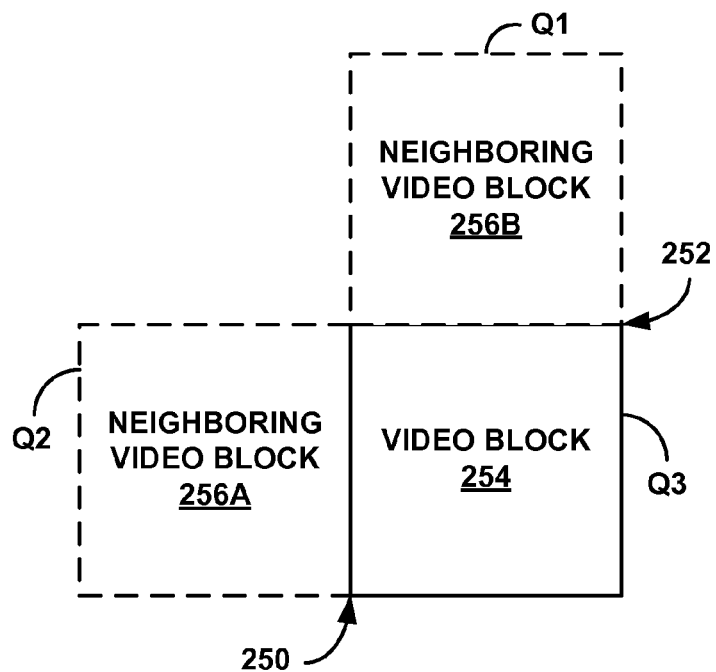
FIGS. 5A & 5B are conceptual diagrams illustrating edges of a current video block to be deblocking filtered according to the techniques of this disclosure.
Figure 5B:
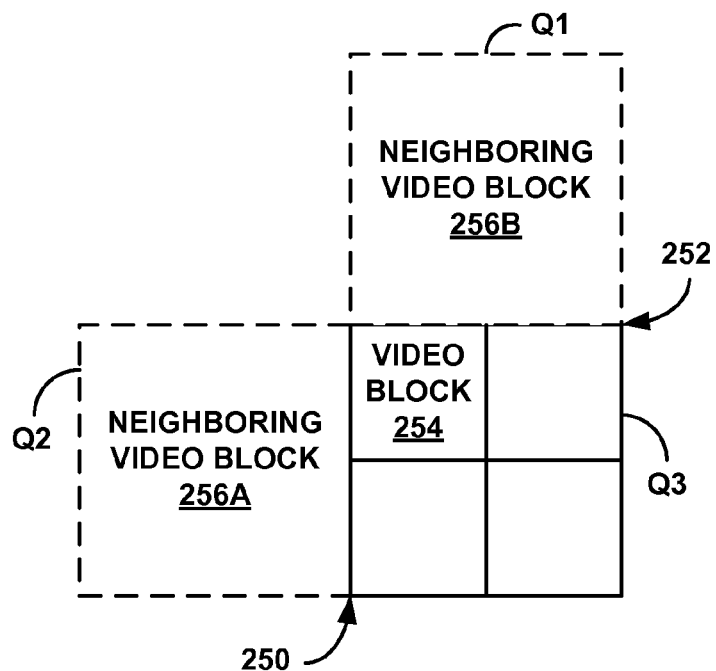

FIGS. 5A & 5B are conceptual diagrams illustrating edges 250 and 252 of a current video block 254 in a quantization group Q3. In general, FIGS. 5A & 5B illustrate current video block 254 having a first neighboring video block 256A to the left of current video block 254 and a second neighboring video block 256B on top of current video block 254. In this way, current video block 254 shares its left edge with first neighboring video block 256A and shares its top edge with second neighboring video block 256B. Current video block 254 and neighboring video blocks 256A and 256B may be 2D blocks of samples within different CUs. Neighboring video block 256A is associated with a CU in a quantization group Q2. Neighboring video block is associated with a CU in a quantization group Q1.

FIG. 5A illustrates an example in which current video block 254 has a size greater than or equal to the minimum CU quantization group size. In this example, quantization group Q3 only includes a CU associated with current video block 254 and only is associated with a single QP value. In the example of FIG. 5A, each of current video block 254, first neighboring video block 256A, and second neighboring video block 256B have a size greater than or equal to the minimum CU quantization group size. In other examples, one or both of first and second neighboring video blocks 256A and 256B may have a size smaller than the minimum CU quantization group size and the associated CUs may be included in their respective quantization groups, Q2 and Q1, with one or more other video blocks. In either case, each of the CUs associated with first and second neighboring video blocks 256A and 256B may have a different QP value than the CU associated with current video block 254.

FIG. 5B illustrates an example in which current video block 254 has a size smaller than the minimum CU quantization group size. In this example, quantization group Q3 includes a CU associated with current video block 254 and CUs associated with one or more other video blocks, all associated with the same single QP value. In the example illustrated in FIG. 5B, each of first neighboring video block 256A and second neighboring video block 256B have a size greater than or equal to the minimum CU quantization group size. In other examples, one or both of first and second neighboring video blocks 256A and 256B may have a size smaller than the minimum CU quantization group size and may be included in their respective quantization groups, Q2 and Q1, with one or more other video blocks. In either case, the CUs associated with each of first and second neighboring video blocks 256A and 256B may have a different QP value than the CU associated with current video block 254.

According to examples illustrated in both FIGS. 5A and 5B, the CU associated with current video block 254 may have a different QP value than the CU associated with neighboring video block 256A. Thus, there may be different QP values on the left and right sides of edge 250. Similarly, the CU associated with current video block 254 may have a different QP value than the CU associated with neighboring video block 256B. Thus, there may be different QP values on the top and bottom sides of edge 252.

A video coder, such as video encoder 20 or video decoder 30, may apply a deblocking filter to samples at edge 250 or edge 252 based on a QP value of the CU associated with current video block 254 (i.e., luma-QP value for a luma edge and chroma-QP value for a chroma edge). The QP value of the CU associated with current video block 254 may only be appropriate, however, for processing internal edges associated with current video block 254. When processing external edges (e.g., left edge 250 or top edge 252) associated with current video block 254, the sub-LCU-level dQP signaling may result in the CUs associated with neighboring video block 256A and neighboring video block 256B having different QP values than the CU associated with current video block 254. Consequently, there may be different QP values on either side of the edges 250 and 252. A deblocking filter based on only one of these QP values may be too strong or too weak. Hence, in accordance with the techniques of the disclosure, the video coder may determine a deblocking QP value based on the QP value of the CU associated with current video block 254 and the QP values of the CUs associated with neighboring video blocks 256A or 256B and may apply a deblocking filter based on the deblocking QP value. In some instances, the deblocking QP value may be referred to as a modified QP value, QP-M.

Figure 6:
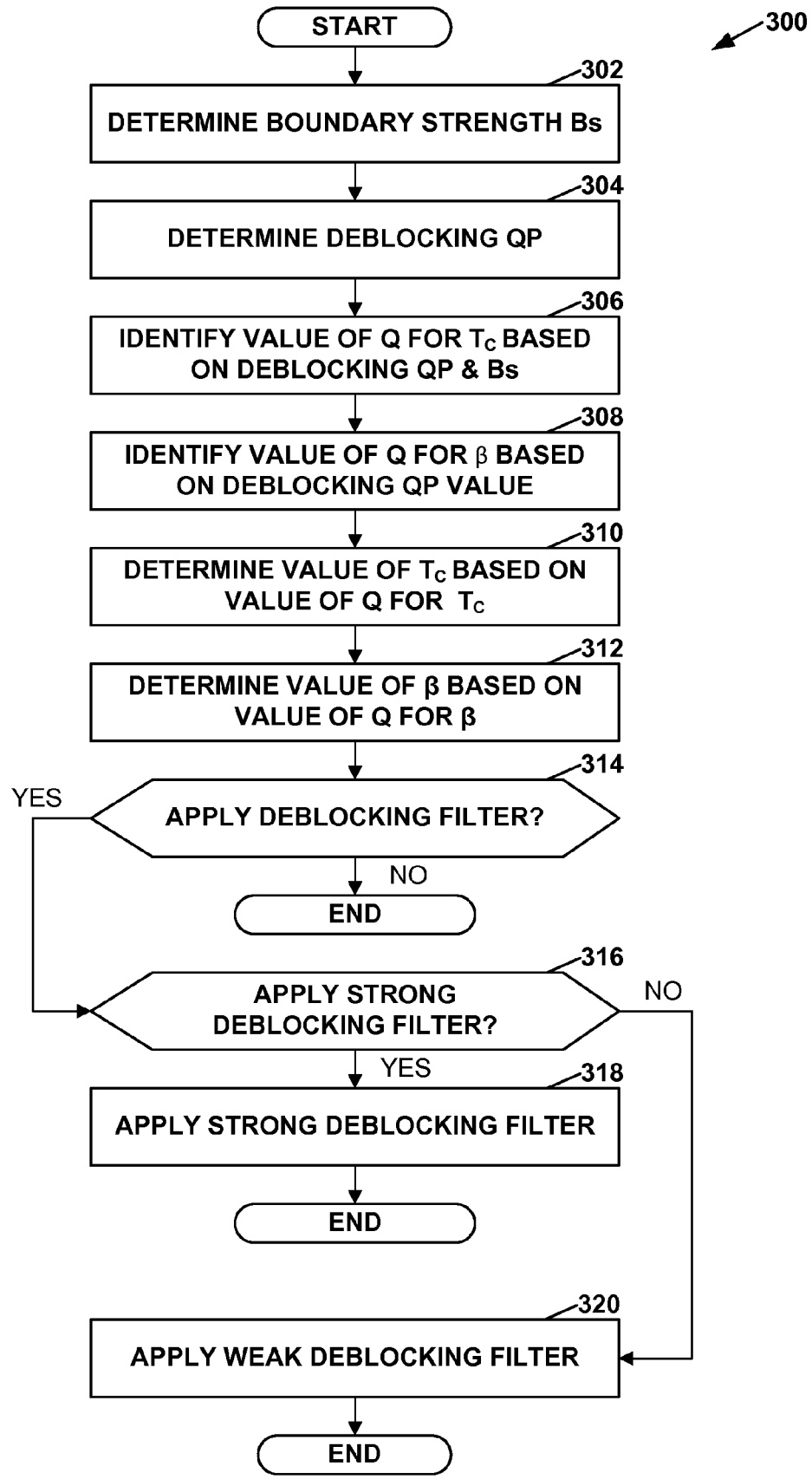
FIG. 6 is a flowchart that illustrates a first example deblocking operation performed by a video coder.

FIG. 6 is a flowchart that illustrates a first example deblocking operation 300 performed by a video coder. In some examples, a video encoder (e.g. video encoder 20) or a video decoder (e.g., video decoder 30) may perform deblocking operation 300. The video coder may perform deblocking operation 300 with regard to edges at boundaries between CUs. In some examples, the video blocks may be 4×4 or 8×8 blocks of samples. Furthermore, in some examples, the video coder may separately perform deblocking operation 300 with regard to luma samples and chroma samples of each of the video blocks in a picture.

After the video coder starts deblocking operation 300, the video coder may determine a boundary strength (Bs) of an edge that occurs at a boundary between a current video block and a neighboring video block (302). The current video block is a video block associated with a CU (i.e., a current CU) that the video coder is currently coding. The edge may coincide with a left or top edge of the current video block. The neighboring video block is a video block associated with a CU (i.e., a neighboring CU) that neighbors the current CU. The edge may coincide with a right or bottom edge of the neighboring video block. The edge may correspond to an edge of video block associated with a TU or a PU of the current CUs.

In some examples, the video coder codes LCUs according a raster scan order and codes CUs within an LCU according to z-scan order. In such examples, the video coder has not yet coded the right neighbor and the below neighbor of the current CU. The above-left, above-right, below-left, and below-right neighbors of the current CU do not share a horizontal or vertical boundary with the current CU. Accordingly, in such examples, the neighboring CU may only be the above neighbor or the left neighbor of the current CU. In the example of FIG. 6, it is assumed that the current CU belongs to a first quantization group and that the neighboring CU belongs to a second quantization group.

The video coder may determine the boundary strength in various ways. For example, the video coder may analyze a 4×4 video block "P" within the current video block and may analyze a 4×4 video block "Q" within the neighboring video block. Video block "P" and video block "Q" may opposite each other across the boundary between the current video block and the neighboring video block. To determine the boundary strength of the edge, the video coder may determine whether the video block "P" or the video block "Q" is associated with an intra predicted CU. In this example, if the video block "P" or the video block "Q" is associated with an intra predicted CU, the video coder may determine that the Bs is equal to two. In other examples, the video coder may determine whether the edge is a CU edge. If the edge is a CU edge, the video coder may determine that the Bs is equal to four. Otherwise, if the edge is not a CU edge, the video coder may determine that the boundary strength is equal to three.

In this example, if neither the video block "P" nor the video block "Q" is associated with an intra predicted CU, the video coder may determine whether the video block "P" or the video block "Q" is associated with a TU of the current or neighboring CU that is associated with one or more non-zero transform coefficient levels. If either the video block "P" or the video block "Q" is associated with a TU that is associated with one or more non-zero transform coefficient levels, the video coder may determine that the boundary strength is equal to one. In other examples, the video coder may determine that the boundary strength is equal to two.

Otherwise, in this example, if neither the video block "P" nor the video block "Q" is associated with a TU that is associated with one or more non-zero transform coefficient levels, the video coder may evaluate one or more conditions. For instance, the video coder may determine whether the video block "P" or the video block "Q" are associated with PUs that have different reference pictures or that have different numbers of motion vectors. In addition, the video coder may determine whether the video block "P" and the video block "Q" are each associated with PUs that have one motion vector and the absolute value of the difference between the horizontal components or the vertical components of the motion vector of the PU of the current CU and the motion vector of the PU of the neighboring CU is greater than one. In addition, if both the PU of the current CU and the PU of the neighboring CU each have two motion vectors and, for at least one pair of the motion vectors, the absolute value of the difference between the horizontal components or the vertical components of the motion vectors is greater than or equal to one. In this example, if any of these conditions evaluate to true, the video coder may determine that the boundary strength is one. Otherwise, if none of the conditions evaluate to true, the video coder may determine that the boundary strength is equal to zero.

In addition, the video coder may determine a deblocking QP value based on at least one of a QP value defined for the first quantization group and a QP value defined for the second quantization group (304). The video coder may use different QP values of the current CU and the neighboring CU depending on the type of samples to which the video coder is applying the deblocking filter. For example, if the video coder is applying the deblocking filter to luma samples at a boundary between the current video block and the neighboring video block, the video coder may determine the deblocking QP value based on a luma QP value associated with the current CU and a luma QP value associated with the neighboring CU.

Likewise, if the video coder is applying the deblocking filter to chroma samples at the boundary between the current video block and the neighboring video block, the video coder may determine the deblocking QP value based on a chroma QP value associated with the current CU and a chroma QP value associated with the neighboring CU.

In some examples, the current CU and/or the neighboring CU may be of an intra pulse code modulation (I_PCM) type. In such examples, the video coder may assume that the QP values associated with the current CU and/or the neighboring CU are equal to zero or another appropriate value.

Furthermore, in some examples, a video encoder may perform lossless encoding on the current CU and/or the neighboring CU. When the video encoder performs lossless encoding on a CU, the video encoder may not quantize (i.e., scale) the transform coefficient blocks associated with the CU or perform in-loop filtering on the video block of the CU. In such examples, the $QP'_Y$ value (i.e., the luma QP value) associated with the CU may be equal to zero and a qprime_y_zero_transquant_bypass_flag associated with the CU may be equal to true. The qprime_y_zero_transquant_bypass_flag may specify that, when $QP'_Y$ is equal to 0, a lossless coding process shall be applied. A sequence parameter set associated with the CU may specify the qprime_y_zero_transquant_bypass_ flag.

The video coder may determine the value of the deblocking QP value in various ways. For example, if both the current CU and the neighboring CU are in the same quantization group, the video coder may use the QP value associated with the current CU or the QP value associated with the neighboring CU as the deblocking QP because the QP value associated with the current CU and the QP value associated with the neighboring CU are the same.

However, if the current CU and the neighboring CU are in different quantization groups, the video coder may determine the deblocking QP value based on the QP value associated with the current CU and the QP value associated with the neighboring CU. The video coder may determine the deblocking QP value based on the QP value associated with the current CU and the QP value associated with the neighboring CU in various ways. For example, the video coder may determine the deblocking QP value based on a maximum of the QP value associated with the current CU and the QP value associated with the neighboring CU. For example, the video coder may select as the deblocking QP whichever is the larger of the QP value associated with the current CU and the QP value associated with the neighboring CU. In this example, the video coder may select the deblocking QP value based on the following formula: QP-M=max(QP-P, QP-Q), where QP-M is the deblocking QP value, QP-P is the QP value associated with the current CU, and QP-Q is the QP value associated with the neighboring CU.

In another example of how the video coder may determine the deblocking QP value, the video coder may determine the deblocking QP value based on whichever is the smaller of the QP value associated with the current CU and the QP value associated with the neighboring CU. For example, the video coder may select the deblocking QP value based on the following formula: QP-M=min(QP-P, QP-Q), where QP-M is the deblocking QP value, QP-P is the QP value associated with the current CU, and QP-Q is the QP value associated with the neighboring CU.

In another example of how the video coder may determine the deblocking QP value, the video coder may determine the deblocking QP value based on an average of the QP value associated with the current CU and the QP value associated with the neighboring CU. For example, the video coder may select the deblocking QP value based on the following formula: QP-M=(QP-P+QP-Q)/2, where QP-M is the deblocking QP value, QP-P is the QP value associated with the current CU, and QP-Q is the QP value associated with the neighboring CU. In another example, the video coder may select the deblocking QP value based on the following formula: $qP_L=((QP_Y+QP_P+1)>>1)$, where $qP_L$ is the deblocking QP value, $QP_Y$ is the QP value associated with the current CU, $QP_P$ is the QP value associated with the neighboring PU, and ">>" is the right shift operator.

In another example of how the video coder may determine the deblocking QP value, filter module 159 may determine the deblocking QP value based on a weighted average of the QP value associated with the current CU and the QP value associated with the neighboring CU. For example, the video coder may select the deblocking QP value based on the following formula: QP-M=p*QP-P+q*QP-Q, where p+q=1, QP-M is the deblocking QP value, QP-P is the QP value associated with the current CU, QP-Q is the QP value associated with the neighboring CU, and "p" and "q" are weights.

After determining the deblocking QP value and the boundary strength, the video coder may identify, based on the deblocking QP value and the boundary strength, a value of a parameter Q for a threshold $t_c$ (306). In some examples, the video coder may identify the value of the parameter Q for $t_c$ using the following pseudo-code:

If Bs>1, the TcOffset=2
If Bs≤1, then TcOffset=0
Q=Clip3(0, MAX_QP+4, QP+TcOffset), where MAX_QP=51.

In the pseudo-code above, "Bs" indicates the boundary strength and "QP" indicates the deblocking QP value. The "Clip3(x, y, z)" function may output x if z<x, outputs y if z>y, and outputs z otherwise. Alternatively, Clip3 may output the smaller of the first parameter and whichever of the second parameter and the third parameter is greater. In a similar example, the last line of the pseudo-code above may specify Q=Clip3(0, MAX_QP+2, QP+TcOffset), where MAX_QP=51.

In another example, the video coder may identify the value of parameter Q for $t_c$ as Q=Clip3(0, MAX_QP+2, $qP_L+2*(Bs-1)+(tc\_offset\_div2<<1)$), where $qP_L$ is the deblocking QP value, Bs is the boundary strength, and "tc_offset_div2" is a deblocking parameter offset for $t_c$.

In addition, the video coder may identify, based on the deblocking QP value, a value of the parameter Q for a threshold β (308). In some examples, filter module 159 may identify the value of parameter Q for β using the following pseudo-code:

Q=Clip3(0, MAX_QP, QP), where MAX_QP=51.

In the pseudo-code above, "Bs," "QP," and "Clip3" may have the same meanings as in the pseudo-code above. In another example, the video coder may identify the value of parameter Q for β as Q=Clip3(0, 51, $qP_L$+(beta_offset_div2<<1)), where $qP_L$ indicates the deblocking QP and "beta_offset_div2" is a deblocking parameter offset for β.

The video coder may then determine a value of $t_c$ based on the value of Q identified for $t_c$ (310). After identifying the value of Q for β, the video coder may determine the value of β based on the value of Q identified for β (312). Because the video coder identifies the values of Q for the thresholds $t_c$ and β based on the deblocking QP value, the video coder in effect identifies the threshold values $t_c$ and β based on the deblocking QP value.

In some examples, the video coder may use the values of Q identified for $t_c$ and β as indexes to look up the values of $t_c$ and β in one or more lookup tables. For instance, the video coder may use the following table to identify values of $t_c$ and β.

TABLE 1

Threshold values $t_c$ and β as a function of a parameter Q derived from QP.

| Q | | | | | | | | | | | | | | | | | | | |
|---|---|---|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | 16 | 17 | 18 |
| β | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |

| Q | | | | | | | | | | | | | | | | | | | |
|---|---|---|---|---|---|---|---|---|---|---|---|---|---|---|---|---|---|---|---|
|  | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 1 | 2 | 2 | 2 | 2 | 3 | 3 | 3 | 3 | 4 | 4 |

| Q | | | | | | | | | | | | | | | | | | |
|---|---|---|---|---|---|---|---|---|---|---|---|---|---|---|---|---|---|---|
|  | 38 | 39 | 40 | 41 | 42 | 43 | 44 | 45 | 46 | 47 | 48 | 49 | 50 | 51 | 52 | 53 | 54 | 55 |
| β | 38 | 40 | 42 | 44 | 46 | 48 | 50 | 52 | 54 | 56 | 58 | 60 | 62 | 64 | 64 | 64 | 64 | 64 |
| $t_C$ | 5 | 5 | 6 | 6 | 7 | 8 | 9 | 9 | 10 | 10 | 11 | 11 | 12 | 12 | 13 | 13 | 14 | 14 |

To use the value of Q as an index to look up a value of $t_c$ or β in this lookup table, the video coder may locate the value of Q in the lookup table and then identify the value specified for $t_c$ or β below the value of Q. In this way, the deblocking QP value (i.e., a modified QP value) may be employed to look up $t_c$ and β in Table 1.

After determining the values of $t_c$ and β, the video coder may determine, based on $t_c$ and β, whether to apply a deblocking filter to one or more lines of samples that cross the boundary between the current video block and the neighboring video block (314). A line of samples may be a series of adjacent samples that are perpendicular to the edge (and hence perpendicular to the boundary between the current video block and the neighboring video block). For example, if the edge is horizontal, the lines are vertical. Likewise, if the edge is vertical, the lines are horizontal.

The video coder may determine whether to apply the deblocking filter in various ways. For example, the edge may be eight samples wide or high. In this example, the video coder may determine, based on the values of $t_c$ and $\beta$, whether to apply the deblocking filter to one or more lines of samples. In this example, the video coder may compute a level of activity $d_1$ in a third line (i.e., i=2) of samples that crosses the edge. In addition, the video coder may compute a level of activity $d_2$ in a sixth line (i.e., i=5) of samples that cross the edge. In this example, the video coder may calculate an activity d of the edge by adding $d_1$ and $d_2$. The video coder may make the determination whether to apply the deblocking filter to all eight lines of samples based on a comparison of the activity d and $\beta$. For instance, if the activity d is low as compared to $\beta$, the video coder may make the determination to apply the deblocking filter to the eight lines of samples. However, if the activity d is high as compared to $\beta$, the video coder may make the determination not to apply the deblocking filter to any of the eight lines of samples. This example may be summarized in the following equations:

$$dp0=|p2_0-2*p1_0+p0_0|$$

$$dp3=|p2_3-2*p1_3+p0_3|$$

$$dq0=|q2_0-2*q1_0+q0_0|$$

$$dq3=|q2_3-2*q1_3+q0_3|$$

$$dpq0=dp0+dq0$$

$$dpq3=dp3+dq3$$

$$d=dpq0+dqp3$$

In this example, the video coder may make the determination to apply the deblocking filter in response to determining that the value d is less than 0. In this example, dp0, dp3, dq0, and dq3 may be measurements of sample activity. In the formula above, $p2_i$, $p1_i$, $q0_i$, etc., are labels for samples. The labels have the following format: letter, number, subscript. The letter indicates a first video block "p" or a second video block "q". The number indicates a number of samples between the sample and a boundary between video block p and video block q. The subscript may indicate a line that includes the sample. For instance, if the boundary is horizontal, the subscript indicates a column that includes the sample. If the boundary is vertical, the subscript indicates a row that includes the sample. FIG. 7 is a conceptual diagram that indicates example labels of samples at a vertical boundary between a first video block "A" and a second video block "B." This disclosure may use this labeling format in other formulas.

In other examples, the video coder may make multiple decisions whether to apply a deblocking filter to the lines of samples in the current video block and the neighboring video block. For example, the edge may be eight samples wide or high. In this example, the video coder may make a determination to whether to apply a deblocking filter to the first four lines of samples. The video coder may make a separate determination whether to apply a deblocking filter to the second four lines of samples. This may reduce the number of determinations of whether to apply the deblocking filter.

In response to making the determination not to apply the deblocking filter to a line of samples ("NO" of 314), the video coder may end operation 300 with regard to the line of samples. However, in response to making the determination to apply the deblocking filter to a line of samples ("YES" of 314), the video coder may determine, based on the threshold values $t_c$ and $\beta$, whether to apply a strong deblocking filter or a weak deblocking filter to the line of samples (316). The video coder may determine whether to apply the strong or weak deblocking filter to the line of samples in various ways.

For example, the video coder may use the following formula to determine whether to apply a strong or a weak deblocking filter to luma values in a line of samples i.

$$sw_i=2(|p2_i-2\cdot p1_i+p0_i|+|q0_i-2\cdot q1_i+q2_i|)<(\beta/4) \text{ and}$$

$$(|p3_i-p0_i|+|q0_i-q3_i|)<(\beta/8) \text{ and}$$

$$|p0_i-q0_i|<((5\cdot t_c+1)/2)$$

In this example, the video coder may make separate determinations of whether to apply a strong or a weak deblocking filter for each line of samples in the current video block. Thus, if the edge is eight samples wide or eight samples high, the video coder may make eight separate determinations.

In another example, the video coder may make one determination for each four lines of samples. For instance, if the current video block is eight samples wide or high, the video coder may make a determination whether to apply a strong or a weak deblocking filter to the first four lines of samples and may make a separate determination whether to apply a strong or a weak deblocking filter to the last four lines of samples. Thus, the video coder may make two separate determinations for the eight lines of samples. For example, if ($sw_0$ AND $sw_3$) are true then the strong deblocking filter shall be applied to lines 0, 1, 2 and 3, otherwise, the weak filter shall be applied.

In response to making the determination to apply a strong deblocking filter to a line of samples ("YES" of 316), the video coder may apply the strong deblocking filter to the line of samples (318). In some examples, applying the strong deblocking filter may modify samples in the current video block up to three samples away from the boundary and may modify samples in the neighboring video block up to three samples away from the boundary.

The video coder may apply the strong deblocking filter in various ways. For example, the video coder may apply the following strong deblocking filter to luma values in the line of samples.

$$p0'=(p2+2*p1+2*p0+2*q0+q1+4)/8$$

$$p1'=(p2+p1+p0+q0+2)/4$$

$$p2'=(2*p3+3*p2+p1+p0+q0+4)/8$$

$$q0'=(p1+2*p0+2*q0+2*q1+q2+4)/8$$

$$q1'=(p0+q0+q1+q2+2)/4$$

$$q2'=(p0+q0+q1+3*q2+2*q3+4)/8$$

In the lines above, "p" may denote the current video block and "q" may denote the neighboring video block. p0, p1, p2, p3 denote samples of the current video block that are respectively zero, one, two, and three samples away from a boundary between the current video block and the neighboring video block. $p_0'$, $p_1'$, and $p_2'$ denote modified values of samples of the current video block that are respectively zero, one, and two samples away from a boundary between the current video block and the neighboring video block. q0, q1, q2, and q3 denote samples of the neighboring video block that are respectively zero, one, two, and three samples away from the boundary between the current video block and the neighboring video block. $q_0'$, $q_1'$, and $q_2'$ denote modified values of samples of the neighboring video block that are respectively zero, one, and two samples away from a boundary between the current video block and the neighboring video block.

In another example, the video coder may apply the following strong deblocking filter to luma values in the line of samples.

$$p0'=\text{Clip3}(p0-2*t_c,p0+2*t_c,(p2+2*p1+2*p0+2*q0+q1+4)>>3)$$

$$p1'=\text{Clip3}(p1-2*t_c,p1+2*t_c,(p2+p1+p0+q0+2)>>2))$$

$$p2'=\text{Clip3}(p2-2*t_c,p2+2*t_c,(2*p3+3*p2+p1+p0+q0+4)>>3))$$

$$q0'=\text{Clip3}(q0-2*t_c,q0+2*t_c,(p1+2*p0+2*q0+2*q1+q2+4)>>3))$$

$$q1'=\text{Clip3}(q1-2*t_c,q1+2*t_c,(p0+q0+q1+q2+2)>>2)$$

$$q2'=\text{Clip3}(q2-2*t_c,q2+2*t_c,(p0+q0+q1+3*q2+2*q3+4)>>3)$$

On the other hand, if the video coder makes the determination not to apply the strong deblocking filter to a line of samples ("NO" of 316), the video coder may apply the weak deblocking filter to the line of samples (320). When the video coder applies the weak deblocking filter, the video coder may modify samples in the current video block up to two samples away from the boundary and may modify samples in the neighboring video block up to two samples away from the boundary.

The video coder may apply the weak deblocking filter in various ways. For example, the video coder may apply the following weak deblocking filter to luma values in the line of samples.

$$\Delta=(9*(q0-p0)-3*(q1-p1)+8)/16$$

If ($\Delta<10*t_c$), then:

$$\Delta=\text{Clip3}(-t_c,t_c,\Delta)$$

$$p0'=\text{Clip1}_Y(p0+\Delta)$$

$$q0'=\text{Clip1}_Y(q0-\Delta)$$

$$\Delta p=\text{Clip3}(-t_c/2,t_c/2,((p2+p0+1)/2-p1+\Delta)/2)$$

$$p1'=\text{Clip1}_Y(p1+\Delta p) \text{ (deblocking of } p1 \text{ depending on decision conditions)}$$

$$\Delta q=\text{Clip3}(-t_c/2,t_c/2,((q2+q0+1)/2-q1-\Delta)/2)$$

$$q1'=\text{Clip1}_Y(q1+\Delta q) \text{ (deblocking of } q1 \text{ depending on decision conditions)}$$

In the lines above, p0, p1, p2, q0, q1, q2, and the "Clip3" function may have the same meanings as those provided above. The Clip1$_Y$ function may limit the value to a range of possible luma values determined by a bit depth of luminance samples.

In some examples, the deblocking filtering of p1 and q1 may depend on a weak filter width decision. In such examples, if the video coder applies a weak deblocking filter to the first four lines of the edge, the video coder may determine whether (dp0+dp3)<3β/16. In response to determining that (dp0+dp3)<3β/16, the video coder may modify p1 of the first four lines of the edge according to the filter above. Furthermore, if the video coder applies a weak deblocking filter to the first four lines of the edge, the video coder may determine whether (dq0+dq3)<3β/16. In response to determining that (dq0+dq3)<3β/16, the video coder may modify q1 of the first four lines of the edge according to the filter above. The video coder may check similar conditions and apply a similar filter if the video coder applies a weak deblocking filter to the last four lines of the edge.

In this way, the edge may be associated with a first line set and a second line set, where the first line set and the second line set each include four lines. When the video coder applies the weak deblocking filter, the video coder may apply the weak deblocking filter to samples of the first video block in the first line set in response to determining that a sum of a sample of the first video block in a first line of the first line set and a sample of the first video block in a fourth line of the first line set is less than a threshold. In addition, the video coder may apply the weak deblocking filter to samples of the second video block in the first line set in response to determining that a sum of a sample of the second video block in the first line of the first line set and a sample of the second video block in the fourth line of the first line set is less than the threshold. The video coder may apply the weak deblocking filter to samples of the first video block in the second line set in response to determining that a sum of a sample of the first video block in a first line of the second line set and a sample of the first video block in a fourth line of the second line set is less than the threshold. In addition, the video coder may apply the weak deblocking filter to samples of the second video block in the second line set in response to determining that a sum of a sample of the second video block in the first line of the second line set and a sample of the second video block in the fourth line of the second line set is less than the threshold.

In some examples, the video coder does not make a determination regarding whether to apply a strong or a weak deblocking filter. Rather, the video coder may only apply one type of deblocking filter. For instance, the video coder may apply the filter above to chroma values without making a determination regarding whether to apply a strong or a weak deblocking filter. In another example, the video coder may apply the following filter to chroma samples:

$$\Delta=\text{Clip3}(-t_c,t_c,((((q0+p0)<<2)+p1-q1+4)>>3))$$

$$p0'=\text{Clip1}_C(p0+\Delta)$$

$$q0'=\text{Clip1}_C(q0-\Delta)$$

The function Clip1$_C$ may limit the value to the range of possible chroma values determined by a bit depth of chrominance samples.

In another example, the video coder may apply the following filter to chroma samples:

$$\Delta=(4*(q0-p0)-(q1-p1)+4)/8$$

$$\Delta=\text{Clip3}(-t_c,t_c,\Delta) \text{ (}t_c \text{ is threshold, depending on quantization parameter)}$$

$$p0'=p0+\Delta$$

$$q0'=q0-\Delta$$

Figure 8:
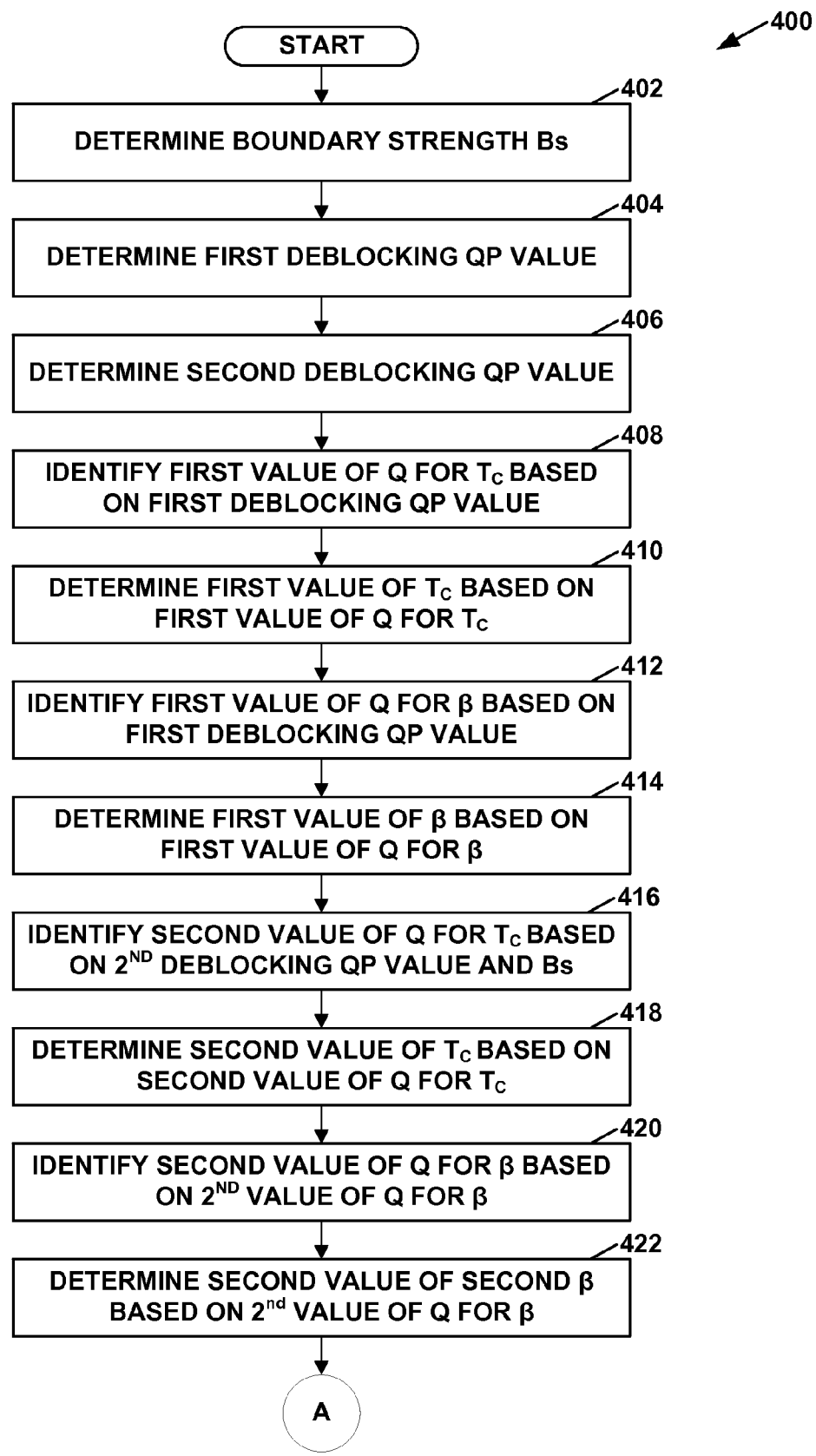
FIG. 8 is a flowchart that illustrates a second example deblocking operation performed by a video coder.

FIG. 8 is a flowchart that illustrates a second example deblocking operation 400 performed by a video coder. In some examples, a video coder such as a video encoder (e.g. video encoder 20) or a video decoder (e.g., video decoder 30) may perform deblocking operation 400. When the video coder performs deblocking operation 400, the video coder may apply a deblocking filter based on a first deblocking QP value to samples in a video block associated with a current CU and may apply a deblocking filter based on a second deblocking QP value to samples in a video block associated with a neighboring CU that are at the boundary between the current CU and the neighboring CU. Consequently, the deblocking filters applied to samples of CUs in different quantization groups may be appropriate for the QP values associated with the CUs.

After the video coder starts deblocking operation 400, the video coder may determine a boundary strength (Bs) of an external edge associated with the current video block (402). The external edge may occur at the boundary between a current video block and a neighboring video block. The current video block may be a 2D block of samples associated with the current CU. The neighboring video block may be a 2D block of samples associated with the neighboring CU. In some examples, the video coder may determine the boundary strength in the manner described above with regard to FIG. 6.

In addition, the video coder may determine a first deblocking QP value (404). In some examples, the first deblocking QP value may be equal to the QP value associated with the current CU. In addition, the video coder may determine a second deblocking QP value (406). In some examples, the second deblocking QP value may be equal to the QP value associated with the neighboring CU.

After determining the first deblocking QP value, the video coder may identify, based on the first deblocking QP value, a first value of a parameter Q for a threshold $t_c$ (408). Furthermore, the video coder may determine, based on the first value of the parameter Q for $t_c$, a first value of $t_c$ (410). The video coder may determine the first value of the parameter Q for $t_c$ and the first value of $t_c$ in the manner described above with regard to FIG. 6.

After identifying the first deblocking QP value, the video coder may also determine, based on the first deblocking QP value, a first value of the parameter Q for a threshold $\beta$ (412). The video coder may also determine, based on the first value of the parameter Q for $\beta$, a first value of $\beta$ (414). The video coder may determine the first value of the parameter Q for $\beta$ and the first value of $\beta$ in the manner described above with regard to FIG. 6.

In addition, the video coder may identify, based on the second deblocking QP value and the boundary strength, a second value of the parameter Q for $t_c$ (416). Next, the video coder may determine, based on the second value of the parameter Q for $t_c$, a second value of $t_c$ (418). The video coder may identify the second value of the parameter Q for $t_c$ and the second value of $t_c$ in the manner described above with regard to FIG. 6.

Furthermore, the video coder may determine, based on the second deblocking QP value and the boundary strength, a second value of the parameter Q for $\beta$ (420). The video coder may then determine, based on the second value of the parameter Q for $\beta$, a second value of $\beta$ (422). The video coder may identify the second value of the parameter Q for $\beta$ and the second value of $\beta$ in the manner described above with regard to FIG. 6. After determining the second value of $\beta$, the video coder may perform the portion of deblocking operation 400 shown in FIG. 9. In this way, a QP-P value may be used to look up $\beta$ and/or $t_c$ thresholds for processing a CU-P side of the current edge, while a QP-Q value may be used to lookup $\beta$ and/or $t_c$ thresholds for processing a CU-Q side of the current edge.

Figure 9:
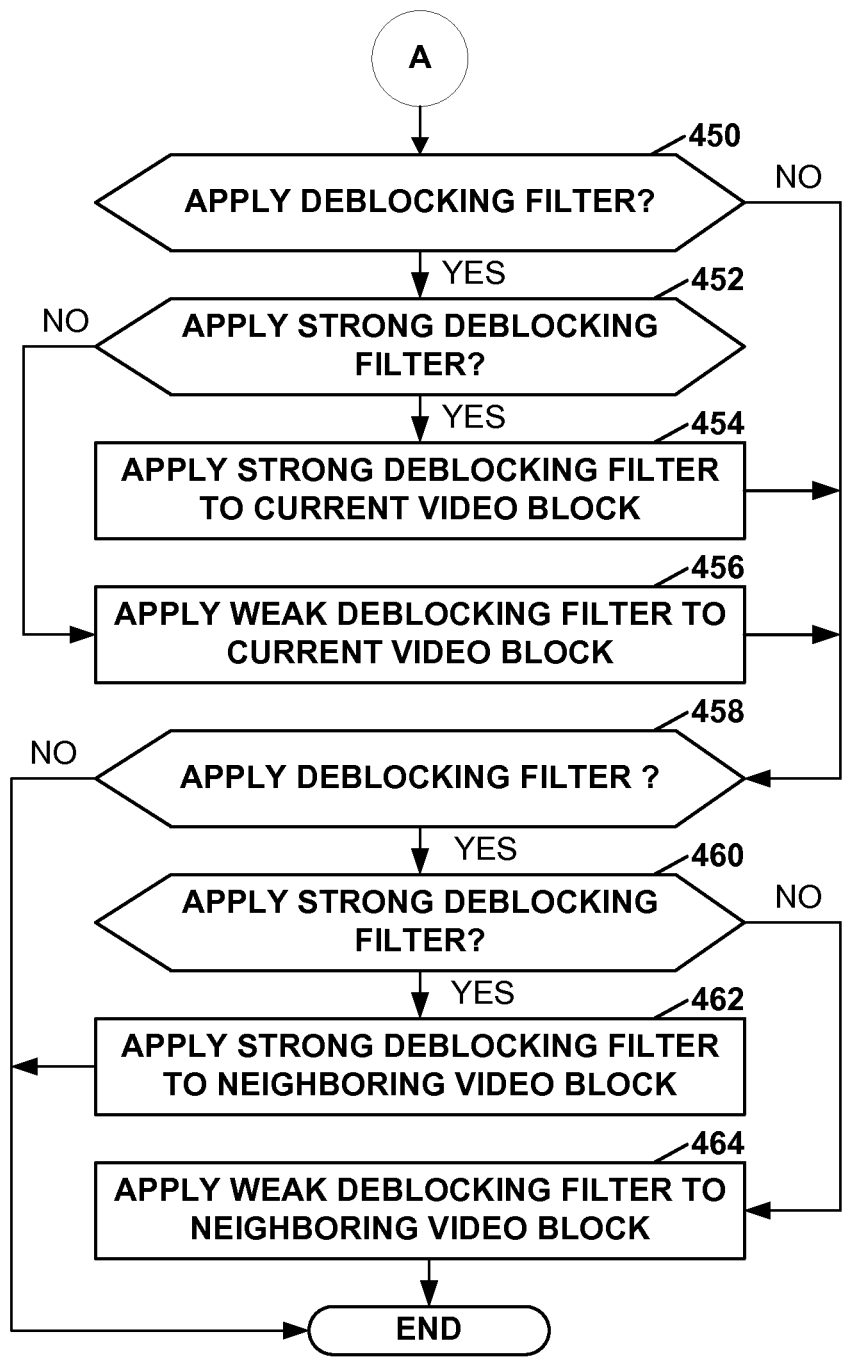
FIG. 9 is a flowchart that illustrates an example continuation of the second deblocking operation.

FIG. 9 is a flowchart that illustrates a continuation of deblocking operation 400. After the video coder starts the portion of deblocking operation 400 shown in FIG. 9, the video coder may determine, based on the first value of $t_c$ and the first value of $\beta$, whether to apply a deblocking filter to a line of samples that crosses the edge (450). The video coder may determine whether to apply the deblocking filter to the line of samples in the manner described above with regard to FIG. 6.

In response to making the determination to apply the deblocking filter to the line of samples ("YES" of 450), the video coder may determine, based on the first value of $t_c$ and the first value of $\beta$, whether to apply a strong deblocking filter to the line of samples (452). The video coder may make the determination whether to apply the strong deblocking filter in the manner described above with regard to FIG. 6. In response to making the determination to apply a strong deblocking filter to the line of samples ("YES" of 452), the video coder may apply the strong deblocking filter only to those samples in the line that are within the current video block (454). The video coder does not modify samples of the neighboring video block.

However, in response to making the determination not to apply a strong deblocking filter to the line of samples (i.e., in response to making a determination to apply a weak deblocking filter to the line of samples) ("NO" of 452), the video coder may apply the weak deblocking filter to those samples in the line that are within the current video block (456). The video coder does not modify samples of the neighboring video block.

After making the determination based on the first value of $t_c$ and the first value of $\beta$ not to apply a deblocking filter ("NO" of 450), after applying a strong deblocking filter in step 454, or after applying a weak deblocking filter in step 456, the video coder may determine, based on the second value of $t_c$ and the second value of $\beta$, whether to apply a deblocking filter to the line of samples (458). The video coder may determine whether to apply the deblocking filter to the line of samples in the manner described above with regard to FIG. 6. In response to making the determination not to apply the deblocking filter to the line of samples ("NO" of 458), the video coder may end deblocking operation 400 with regard to the line of samples.

However, in response to making the determination based on the second value of $t_c$ and the second value of $\beta$ to apply the deblocking filter to the line of samples ("YES" of 458), the video coder may determine whether to apply a strong deblocking filter to the line of samples (460). In response to making the determination to apply the strong deblocking filter to the line of samples ("YES" of 460), the video coder may apply a strong deblocking filter to those samples in the line that are within the neighboring video block (462). The video coder may make the determination whether to apply the strong deblocking filter to the line of samples in the manner described above with regard to FIG. 6. However, the video coder does not modify samples in the current video block when the video coder applies the strong deblocking filter in step 462. After applying the strong deblocking filter to the line of samples, the video coder may end deblocking operation 400 with regard to the line of samples.

In response to making the determination not to apply the strong deblocking filter to the line of samples (i.e., in response to making the determination to apply a weak deblocking filter to the line of samples) ("NO" of 460), the video coder may apply the weak deblocking filter to those samples in the line that are within the neighboring video block (464). The video coder may make the determination whether to apply the weak deblocking filter to the line of samples in the manner described above with regard to FIG. 6. However, the video coder does not modify samples of the current video block when the video coder applies the weak deblocking filter in step 464. After applying the weak deblocking filter to the line of samples, the video coder may end deblocking operation 400 with regard to the line of samples. The video coder may perform steps 450-464 with regard to each line of samples that crosses the edge.

In some examples, the deblocking filtering of p1 and q1 may depend on a weak filter width decision. In such examples, if the video coder applies a weak deblocking filter to the first four lines of the edge, the video coder may determine whether $(dp0+dp3)<3\beta/16$. In response to determining that $(dp0+dp3)<3\beta/16$, the video coder may modify $p1$ of the first four lines of the edge according to the following filter:

$$\Delta=(9*(q0-p0)-3*(q1-p1)+8)/16$$

If $(\Delta<10*t_c)$, then:

$$\Delta=\text{Clip3}(-t_c,t_c,\Delta)$$

$$\Delta p=\text{Clip3}(-t_c/2,t_c/2,((p2+p0+1)/2-p1+\Delta)/2)$$

$$p1'=\text{Clip1}_Y(p1+\Delta p)$$

$$\Delta q=\text{Clip3}(-t_c/2,t_c/2,((q2+q0+1)/2-q1-\Delta)/2)$$

$$q1'=\text{Clip1}_Y(q1+\Delta q)$$

Furthermore, if the video coder applies a weak deblocking filter to the first four lines of the edge, the video coder may determine whether $(dq0+dq3)<3\beta/16$. In response to determining that $(dq0+dq3)<3\beta/16$, the video coder may modify $q1$ of the first four lines of the edge according to the filter above. The video coder may check similar conditions and apply a similar filter if the video coder applies a weak deblocking filter to the last four lines of the edge.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    extracting from a coded representation of the video data, a plurality of syntax elements, the syntax elements including a first delta quantization parameter (dQP) syntax element and a second dQP syntax element, wherein a picture of the video data is partitioned into a plurality of Largest Coding Units (LCUs), the plurality of LCUs including a particular LCU that includes a plurality of coding units (CUs), each respective CU of the plurality of CUs corresponding to a respective video block, the CUs of the particular LCU being grouped into a plurality of quantization groups that includes at least a first quantization group and a second quantization group;
    adding the first dQP syntax element to a predicted quantization parameter (QP) value from a first neighboring CU to determine a first QP value, wherein the first QP value is associated with each CU in the first quantization group;
    adding the second dQP syntax element to a predicted QP value from a second each CU in the second quantization group, the second-quantization group including multiple CUs or the particular LCU, each of the CUs of the second quantization group having a size smaller than a minimum CU quantization group size, wherein all leaf CUs within any CU having the minimum CU quantization group size share the same QP value, and wherein a dQP syntax element is only signaled for any leaf CU if the leaf CU is large than or equal to the minimum CU quantization group size;
    determining a deblocking QP value based on an average of the first QP value and the second QP value;
    identifying threshold values based on the deblocking QP value;

making a determination, based on the threshold values, whether to apply a strong deblocking filter or a weak deblocking filter; and applying a deblocking filter based on the deblocking QP value to an edge occurring at a boundary between a first video block and a second video block, the first video block being associated with a first CU, the second video block being associated with a second CU, the first CU being in the first quantization group, the second CU being in the second quantization group, wherein applying the deblocking filter comprises:

applying, in response to making the determination to apply the strong deblocking filter, the strong deblocking filter to modify samples of the first video block up to three samples away from the boundary and to modify samples of the second video block up to three samples away from the boundary; and applying, in response to making the determination to apply the weak deblocking filter, the weak deblocking filter to modify samples of the first video block up to two samples away from the boundary and to modify samples of the second video block up to two samples away from the boundary.

2. The method of claim 1, further comprising:
making a determination, based on the threshold values, to apply the deblocking filter to the edge.

3. The method of claim 1, wherein the deblocking QP value is a first deblocking QP value, the first deblocking QP value is equal to the first QP value, and a second deblocking QP value is equal to the second QP value; and
wherein the method further comprises applying a deblocking filter based on the second deblocking QP value to samples of the second video block that are at the boundary between the first video block and the second video block.

4. The method of claim 1, further comprising: decoding the video data based on the syntax elements extracted from the coded representation of the video data.

5. A video decoding device that comprises:
a data storage medium configured to video data, and one or more processors that are configured to:
extract, from a coded representation of the video data, a plurality of syntax elements, the syntax elements including a first delta quantization parameter (dQP) syntax element and a second dQP syntax element, wherein a picture of the video data is partitioned into a plurality of Largest Coding Units (LCUs), the plurality of LCUs including a particular LCU that includes a plurality of coding units (CUs), each respective CU of the plurality of CUs corresponding to a respective video block, the CUs of the particular LCU being grouped into a plurality of quantization groups that includes at least a first quantization group and a second quantization group;
adding the first dQP syntax element to a predicted quantization parameter (QP) value from a first neighboring CU to determine a first QP value, wherein the first QP value is associated with each CU in the first quantization group;
adding the second dQP syntax element to a predicted QP value from a second each CU in the second quantization group, the second-quantization group including multiple CUs or the particular LCU, each of the CUs of the second quantization group having a size smaller than a minimum CU quantization group size, wherein all leaf CUs within any CU having the minimum CU quantization group size share the same QP value, and wherein a dQP syntax element is only signaled for any leaf CU if the leaf CU is large than or equal to the minimum CU quantization group size;

determine a deblocking QP value based on an average of the first QP value and the second QP value;

identify threshold values based on the deblocking QP value;

make a determination, based on the threshold values whether to apply a strong deblocking filter or a weak deblocking filter; and apply a deblocking filter based on the deblocking QP value to an edge occurring at a boundary between a first video block and a second video block, the first video block being associated with a first CU, the second video block being associated with a second CU, the first CU being in the first quantization group, the second CU being in the second quantization group, wherein, to apply the deblocking filter, the one or more processors are configured to:

apply, in response to making the determination to apply the strong deblocking filter to modify samples of the first video block up to three samples away from the boundary and to modify samples of the second video block up to three samples away from the boundary; and apply, in response to making the determination to apply the weak deblocking filter, the weak deblocking filter to modify samples of the first video block up to two samples away from the boundary and to modify samples of the second video block up to two samples away from the boundary.

6. The video coding device of claim 5, wherein the one or more processors are further configured to:
make a determination, based on the threshold values, to apply the deblocking filter to the edge.

7. The video decoding device of claim 5, wherein the deblocking QP value is a first deblocking QP value, the first deblocking QP value is equal to the first QP value, and a second deblocking QP value is equal to the second QP value; and
wherein the one or more processors are further configured to apply a deblocking filter based on the second deblocking QP value to samples of the second video block that are at the boundary between the first video block and the second video block.

8. The video coding device of claim 5, wherein the one or more processors are configured to:
decode the video data based on the syntax elements extracted from the coded representation of the video data.

9. A method of encoding video data, the method comprising: determining a deblocking quantization parameter (QP) value based on an average of a first QP value and a second QP value;

identifying threshold values based on the deblocking QP value;

making a determination, based on the threshold values, whether to apply a strong deblocking filter or a weak deblocking filter;

applying a deblocking filter based on the deblocking QP value to an edge occurring at a boundary between a first video block and a second video block, the first video block being associated with a first coding unit (CU), the second video block being associated with a second CU, the first CU being in the first quantization group, the second CU being in the second quantization group, wherein applying the deblocking filter comprises:

applying, in response to making the determination to apply the strong deblocking filter to modify samples of the first video block up to three samples away from the boundary and to modify samples of the second video block up to three samples away from the boundary; and applying, in response to making the determination to apply the weak deblocking filter, the weak deblocking filter to modify samples of the first video block up to two samples away from the boundary and to modify samples of the second video block up to two samples away from the boundary; and generating a coded representation of the video data, the coded representation of the video data including a plurality of syntax elements, the syntax elements including a first delta quantization parameter (dQP) syntax element and a second dQP syntax element, wherein a picture of the video data is partitioned into a plurality of Largest Coding Unit (LCUs), the plurality of LCUs including a particular LCU that includes a plurality of CUs, each respective CU of the plurality of CUs corresponding to a respective video block, the CUs of the particular LCU being grouped into a plurality of quantization groups that includes at least the first quantization and the second quantization group, wherein:

the first dQP syntax element plus a predicted QP value from a first neighboring CU is equal to the first QP value, the first QP value being associated with each CU in the first quantization group, the second dQP syntax element plus a predicted QP value from a second neighboring CU is equal to the second QP value, the second QP value is associated with each CU in the second quantization group, the second quantization group including multiple CUs of the particular LCU, each of the CUs of a second quantization group having a size smaller than a minimum CU quantization group size, wherein all leaf CUs within any CU having the minimum CU quantization group size share the same QP value, and wherein any dQP syntax element is only signaled for a leaf CU if the leaf CU is larger than or equal to the minimum CU quantization group size.

10. The method of claim 9, further comprising:
making a determination, based on the threshold values, to apply the deblocking filter to the edge.

11. The method of claim 9,
wherein the deblocking QP value is a first deblocking QP value, the first deblocking QP value is equal to the first QP value, and a second deblocking QP value is equal to the second QP value; and
wherein the method further comprises applying a deblocking filter based on the second deblocking QP value to samples of the second video block that are at the boundary between the first video block and the second video block.

12. The method of claim 9, further comprising:
after applying the deblocking filter, storing samples of the first video block in a decoded picture buffer; and
performing, based on the samples of the first video block that are in the decoded picture buffer, an intra prediction or inter prediction operation on a prediction unit (PU) of a third CU.

13. A video encoding device that comprises;
a data storage medium configured to store video data; and
one or more processors that are configured to:

determine a deblocking quantization parameter (QP) value based on an average of a first QP value and a second QP value;
identify threshold values based on the deblocking QP value:
make a determination whether to apply a strong deblocking filter or a weak deblocking filter;
apply a deblocking filter based on the deblocking QP value to an edge occurring at a boundary between a first video block and a second video block, the first video block being associated with a first coding unit (CU), the second video block being associated with a second CU, the first CU being in the first quantization group, the second CU being in the second quantization group, wherein, to apply the deblocking filter, the one or more processors are configured to:
apply, in response to making the determination to apply the strong deblocking filter to modify samples of the first video block up to three samples away from the boundary and to modify samples of the second video block up to three samples away from the boundary; and
apply, in response to making the determination to apply the weak deblocking filter, the weak deblocking filter to modify samples of the first video block up to two samples away from the boundary and to modify samples of the second video block up to two samples away from the boundary; and
generate a coded representation of video data, the coded representation of the video data including a plurality of syntax elements, the syntax elements including a first delta quantization parameter (dQP) syntax element and a second dQP syntax element, wherein a picture of the video data is partitioned into a plurality of Largest Coding Units (LCUs), the plurality of LCUs including a particular LCU that includes a plurality of CUs; each respective CU of the plurality of CUs corresponding to a respective video block, the CUs of the particular LCU being grouped into a plurality of quantization groups that includes at least the first quantization group and the second quantization group, wherein:
the first dQP syntax element plus a predicted QP value from a first neighboring CU is equal to the first QP value, the first QP value being associated with each CU in the first quantization group,
the second dQP syntax element plus a predicted QP value from a second neighboring CU is equal to the second QP value, the second QP value being associated with each CU in the second quantization group, the second quantization group including multiple CUs of the particular LCU, each of the CUs of the second quantization group having a size smaller than a minimum CU quantization group size, wherein all leafs CUs within any CU having the minimum CU quantization group size share the same QP value, and wherein a dQP syntax element is only signaled for any leaf CU if the leaf CU is larger than or equal to the minimum CU quantization group size.

14. The video encoding device of claim 13, wherein the one or more processors are further configured to:
make a determination, based on the threshold values, to apply the deblocking filter to the edge.

15. The video encoding device of claim 13,
wherein the deblocking QP value is a first deblocking QP value, the first deblocking QP value is equal to the first QP value, and a second deblocking QP value is equal to the second QP value; and wherein the one or more processors are further configured to apply a deblocking filter based on the second deblocking QP value to samples of the second video block that are at the boundary between the first video block and the second video block.

16. The video encoding device of claim 13, wherein the one or more processors are configured to, after applying the deblocking filter, samples of the first video block in a decoded picture buffer; and
perform based on the samples of the first video block that are in the decoded picture buffer, an inter prediction or inter prediction operation on a prediction unit (PU) of a third CU.

17. The video decoding device of claim 5, wherein the video decoding device comprises at least one of:
an integrated circuit:
a microprocessor; or
a wireless communication device.

18. The video encoding device of claim 13, wherein the video encoding device comprises at least one of:
an integrated circuit:
a microprocessor; or
a wireless communication device.

19. The video decoding device of claim 5, further comprising a display configured to display decoded picture of the video data.

20. The video encoding device of claim 13, further comprising a camera configured to capture the video data.

* * * * *